(12) United States Patent
Karam

(10) Patent No.: US 7,724,650 B2
(45) Date of Patent: May 25, 2010

(54) MULTI-STATION PHYSICAL LAYER COMMUNICATION OVER TP CABLE

(75) Inventor: Roger A. Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1332 days.

(21) Appl. No.: 11/154,212

(22) Filed: Jun. 15, 2005

(65) Prior Publication Data

US 2006/0117089 A1    Jun. 1, 2006

Related U.S. Application Data

(63) Continuation-in-part of application No. 11/000,734, filed on Nov. 30, 2004.

(51) Int. Cl.
  *H04Q 1/20* (2006.01)
  *G06F 1/26* (2006.01)
  *G06F 1/00* (2006.01)
  *G08C 17/06* (2006.01)

(52) U.S. Cl. .................. 370/217; 370/255; 340/425.2; 340/538.14; 713/340; 714/14

(58) Field of Classification Search .................. 370/217, 370/241, 248, 254, 255; 340/425.2, 533, 340/538, 538.14, 538.15; 714/14; 713/340
See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |

(Continued)

FOREIGN PATENT DOCUMENTS

WO    WO96/23377    8/1996

OTHER PUBLICATIONS

"IEEE Standard 802.3af™", IEEE Standard for Information Technology-Telecommunications and Information Exchange Between Systems-Local and Metropolitan Area Networks-Specific Requirement, IEEE The Institute of Electrical and Electronics Engineering, Inc., Jun. 18, 2003.

(Continued)

*Primary Examiner*—Chi H Pham
*Assistant Examiner*—Ahmed Elallam
(74) *Attorney, Agent, or Firm*—BainwoodHuang

(57) ABSTRACT

Wired data telecommunications networks can make advantageous use of a communications capability between and among more than two network devices. Such capabilities may be utilized in providing redundancy of data and/or inline power capabilities from a pair of network devices to a third network device receiving the redundant capability. Impedance modulated communications are provided in a wired data telecommunications network among at least a first, second and third network device coupled together via a Y device. The Y device couples the three network devices (higher order Y devices could couple more than three devices) allowing monitoring of communications and inline power provision so that one of the network devices may act in response to monitored conditions by communicating via impedance modulated communications with one or both of the other network devices.

16 Claims, 22 Drawing Sheets

U.S. PATENT DOCUMENTS

| | | | |
|---|---|---|---|
| 5,331,631 | A | 7/1994 | Teraslinna |
| 5,386,567 | A | 1/1995 | Lien et al. |
| 5,406,260 | A | 4/1995 | Cummings et al. |
| 5,461,671 | A | 10/1995 | Sakuragi et al. |
| 5,483,574 | A | 1/1996 | Yuyama |
| 5,491,804 | A | 2/1996 | Heath et al. |
| 5,531,612 | A | 7/1996 | Goodall et al. |
| 5,608,792 | A | 3/1997 | Laidler |
| 5,613,130 | A | 3/1997 | Teng et al. |
| 5,639,267 | A | 6/1997 | Loudermilk |
| 5,726,506 | A | 3/1998 | Wood |
| 5,742,513 | A | 4/1998 | Bouhenguel et al. |
| 5,758,102 | A | 5/1998 | Carey et al. |
| 5,775,946 | A | 7/1998 | Briones |
| 5,790,391 | A | 8/1998 | Stich et al. |
| 5,790,873 | A | 8/1998 | Popper et al. |
| 5,793,987 | A | 8/1998 | Quackenbush et al. |
| 5,796,185 | A | 8/1998 | Takata et al. |
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,295,356 | B1 | 9/2001 | DeNicolo |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,701,443 | B1 | 3/2004 | Bell |
| 6,748,557 | B1 | 6/2004 | Beardsley et al. |
| 6,762,675 | B1 | 7/2004 | Cafiero et al. |
| 6,764,343 | B2 | 7/2004 | Ferentz |
| 6,804,351 | B1 | 10/2004 | Karam |
| 6,925,578 | B2 | 8/2005 | Lam et al. |
| 6,938,179 | B2 | 8/2005 | Iyer et al. |
| 6,958,699 | B1 | 10/2005 | Karam |
| 6,986,071 | B2 | 1/2006 | Darshan et al. |
| 6,996,134 | B1* | 2/2006 | Renucci et al. ............. 370/535 |
| 6,996,458 | B2 | 2/2006 | Pincu et al. |
| 7,058,847 | B1 | 6/2006 | Guzman et al. |
| 7,089,126 | B2 | 8/2006 | Muir |
| 7,107,358 | B2 | 9/2006 | Vasko et al. |
| 7,145,439 | B2 | 12/2006 | Darshan et al. |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 7,194,639 | B2* | 3/2007 | Atkinson et al. ............. 713/300 |
| 7,221,261 | B1 | 5/2007 | Klingensmith et al. |
| 7,272,746 | B2 | 9/2007 | Deerman et al. |
| 7,299,368 | B2* | 11/2007 | Peker et al. ................. 713/300 |
| 7,308,612 | B1 | 12/2007 | Bishara |
| 7,455,527 | B2* | 11/2008 | Nordin et al. ................. 439/49 |
| 7,504,748 | B2* | 3/2009 | Chang et al. ................. 307/126 |
| 7,515,526 | B2* | 4/2009 | Elkayam et al. ............. 370/217 |
| 2004/0049321 | A1 | 3/2004 | Lehr et al. |
| 2004/0073597 | A1 | 4/2004 | Caveney et al. |
| 2004/0139371 | A1 | 7/2004 | Wilson et al. |
| 2004/0146061 | A1 | 7/2004 | Bisceglia et al. |
| 2004/0260794 | A1 | 12/2004 | Ferentz et al. |
| 2005/0132240 | A1 | 6/2005 | Stineman, Jr. et al. |
| 2005/0165032 | A1 | 7/2005 | Norman et al. |
| 2005/0197094 | A1 | 9/2005 | Darshan et al. |
| 2005/0257262 | A1 | 11/2005 | Matityahu et al. |
| 2006/0117212 | A1 | 6/2006 | Meyer et al. |
| 2006/0239183 | A1* | 10/2006 | Robitaille et al. ........... 370/217 |

OTHER PUBLICATIONS

"3Com® NJ100 Network Jack Power", printed from http://www.poweroverethernet.com/manual/content/view/full/776/, 3Com, Tuesday, Mar. 18, 2003.

3Com User Guide-3Com IntelliJack, Model NJ220, Version 1.0, 3Com, Nov. 2003.

International Search Report for International Application No. PCT/US2005/036392, date of mailing Mar. 10, 2006.

"3Com User Guide," 3Com Network Jack, Model NJ200, Version 1.0, 3Com, Sep. 2002.

International Search Report for International Application No. PCT/US2005/036329, date of mailing Sep. 4, 2006.

International Search Report for International Application No. PCT/US2005/036328, date of mailing Aug. 3, 2006.

International Preliminary Report on Patentability Application No. PCT/US2005/036328, date of mailing May 18, 2007.

Invitation to Pay Additional Fees (Partial International Search), Application No. PCT/US2005/036328, date of mailing May 26, 2006.

G. Mendelson, XP-002372480 Power Dsine, White Paper, All You Need to Know About Power Over Ethernet (PoE) and the IEEE 802.3af Standard, Jun. 2004.

Lynn, K., "Universal Serial Bus (USB) Power Management," Wescon Conference, IEEE, Sep. 1998, pp. 194-201.

* cited by examiner

MULTI-STATION PHYSICAL LAYER COMMUNICATION OVER TP CABLE

STATEMENT OF RELATED CASES

This patent is a continuation-in-part of and may be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may also be considered to be related to commonly owned U.S. Pat. No. 7,363,525 filed on Oct. 7, 2004, issued on Apr. 22, 2008, and entitled "Bidirectional Inline Power Port" in the names of inventors Daniel Biederman, Kenneth Coley and Frederick R. Schindler.

This patent may also be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may also be considered to be related to commonly owned U.S. patent application Ser. No. 10/961,904 filed on Oct. 7, 2004 and entitled "Inline Power—Based Common Mode Communications in a Wired Data Telecommunications Network" in the names of inventors Roger A. Karam, Frederick R. Schindler and Wael William Diab.

This patent may also be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero.

This patent may also be considered to be related to commonly owned U.S. patent application Ser. No. 10/982,383 filed on Nov. 5, 2004 and entitled "Power Management for Serial-Powered Device Connections" in the name of inventor Roger A. Karam.

This patent may also be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may also be considered to be related to commonly owned U.S. patent application Ser. No. 10/981,203 filed on Nov. 3, 2004 and entitled "Powered Device Classification In A Wired Data Telecommunications Network" in the name of inventors Roger A. Karam and John F. Wakerly.

This patent may also be considered to be related to commonly owned U.S. Pat. No. 7,457,252 filed on Nov. 3, 2004, issued on Nov. 25, 2008, and entitled "Current Imbalance Compensation for Magnetics in a Wired Data Telecommunications Network" in the names of inventors Roger A. Karam and John F. Wakerly.

This patent may also be considered to be related to commonly owned U.S. patent application Ser. No. 10/845,021 filed May 13, 2004 and entitled "Improved Power Delivery over Ethernet Cable" in the names of inventors Wael William Diab and Frederick R. Schindler.

This patent may also be considered to be related to commonly owned U.S. Pat. No. 6,541,878 entitled "Integrated RJ-45 Magnetics with Phantom Power Provision" in the name of inventor Wael William Diab.

This patent may also be considered to be related to commonly owned U.S. Pat. No. 7,353,407 filed May 20, 2004, issued on Apr. 1, 2008, and entitled "Methods and Apparatus for Provisioning Phantom Power to Remote Devices" in the name of inventors Wael William Diab and Frederick R. Schindler.

This patent may also be considered to be related to co-pending commonly owned U.S. Pat. No. 6,958,699 filed Dec. 18, 2001, issued on Oct. 25, 2005, and entitled "Signal Disruption Detection in Powered Networking Systems" in the name of inventor Roger A. Karam.

This patent may also be considered to be related to commonly owned U.S. patent application Ser. No. 11/139,007 filed on May 25, 2005 and entitled "Detecting and Compensating for Wiring Faults on Ports of a Network Device Providing Inline Power" in the name of inventor Roger A. Karam.

This patent may also be considered to be related to commonly owned U.S. patent application Ser. No. 11/074,923 filed on Mar. 7, 2005 and entitled "Wiring Closet Redundancy" in the name of inventors Michael Smith, Jeffrey Y. Wang and Roger A. Karam.

This patent may also be considered to be related to commonly owned U.S. patent application Ser. No. 11/144,094 filed on Jun. 2, 2005 and entitled "Inline Power for Multiple Devices in a Wired Data Telecommunications Network" in the name of inventors John Albert Toebes, Ping Li and Jack C. Cham.

FIELD OF THE INVENTION

The present invention relates generally to networking equipment which is powered by and/or powers other networking equipment over wired data telecommunications network connections.

BACKGROUND OF THE INVENTION

Inline power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published Jun. 18, 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 820.3af standard is a globally applicable standard for combining the transmission of Ethernet packets with the transmission of DC-based power over the same set of wires in a single Ethernet cable. It is contemplated that Inline power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard. Two conductor wiring such as shielded or unshielded twisted pair wiring (or coaxial cable or other conventional network cabling) may be used so each transmitter and receiver has a pair of conductors associated with it.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether inline power is delivered over Pair 1-2, Pair 3-4 or Pair 1-2+Pair 3-4. In the circuit shown in FIG. 1E a PD associated with Pair 1-2 is powered by inline power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline power is also available through techniques that are non-IEEE 802.3 standard compliant as is well known to those of ordinary skill in the art.

In order to provide regular inline power to a PD from a PSE it is a general requirement that two processes first be accomplished. First, a "discovery" process must be accomplished to verify that the candidate PD is, in fact, adapted to receive inline power. Second, a "classification" process must be accomplished to determine an amount of inline power to allocate to the PD, the PSE having a finite amount of inline power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some inline power (not "regular" inline power, i.e., reduced voltage and limited current) as the discovery signal to measure resistance across the two pairs of conductors to determine if the 25,000 ohm identity network is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular inline power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
| --- | --- | --- |
| 0 | 0-5 | 15.4 |
| 1 | 8-13 | 4.0 |
| 2 | 16-21 | 7.0 |
| 3 | 25-31 | 15.4 |
| 4 | 35-45 | Reserved |

The discovery process is therefore used in order to avoid providing inline power (at full voltage of −48VDC) to so-called "legacy" devices which are not particularly adapted to receive or utilize inline power.

The classification process is therefore used in order to manage inline power resources so that available power resources can be efficiently allocated and utilized.

In wired data telecommunications networks it would be advantageous to provide additional communications capabilities between and among more than two network devices. Disclosed below are a number of embodiments which enable three (or more) network devices to be connected together for various purposes such as redundancy, advanced automation, and the like. In such implementations it would be desirable to provide communications mechanisms in order to accomplish communications among such devices which do not unreasonably interfere with existing communications protocols used on such wired data telecommunications networks.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention described in the following detailed description are directed at multi-station physical layer communication over twisted-pair cable in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
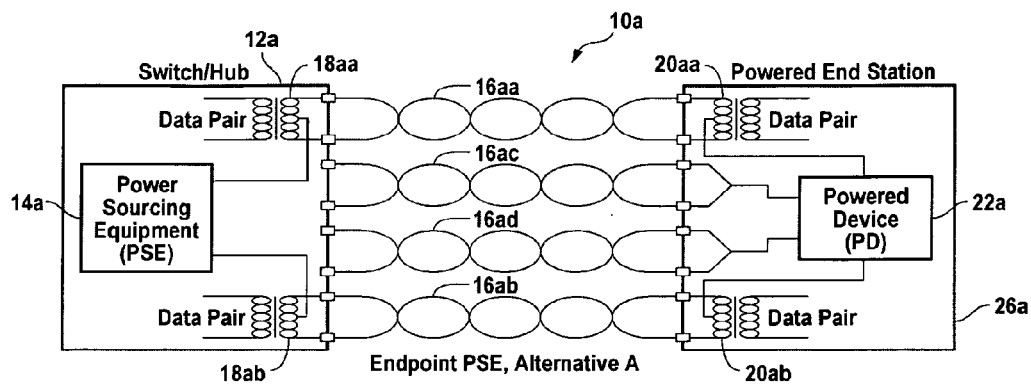
FIGS. 1A, 1B, 1C, 1D and 1E are electrical schematic diagrams of portions of data telecommunications networks in accordance with the prior art.
Figure 1B:
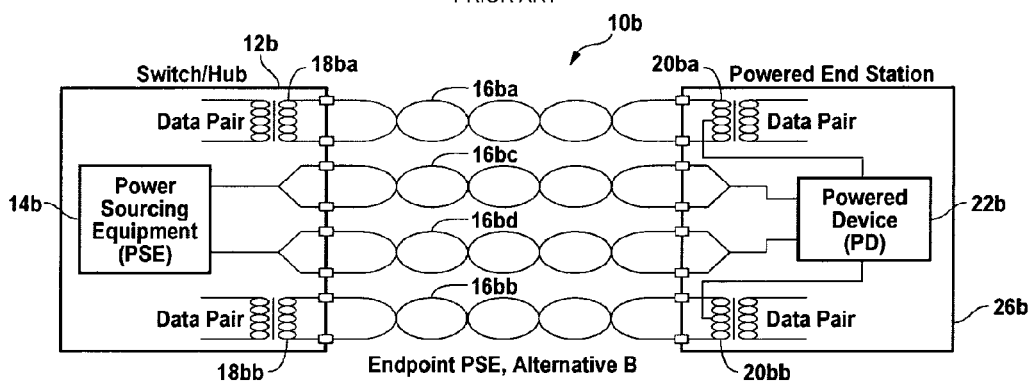
Figure 1C:
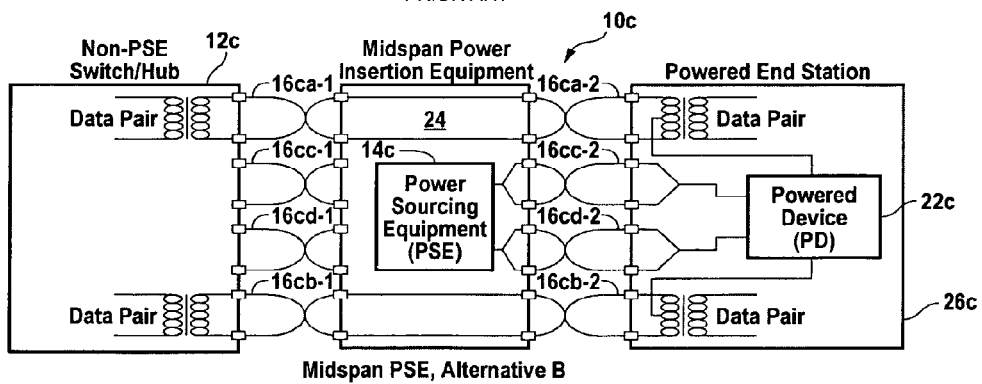
Figure 1D:
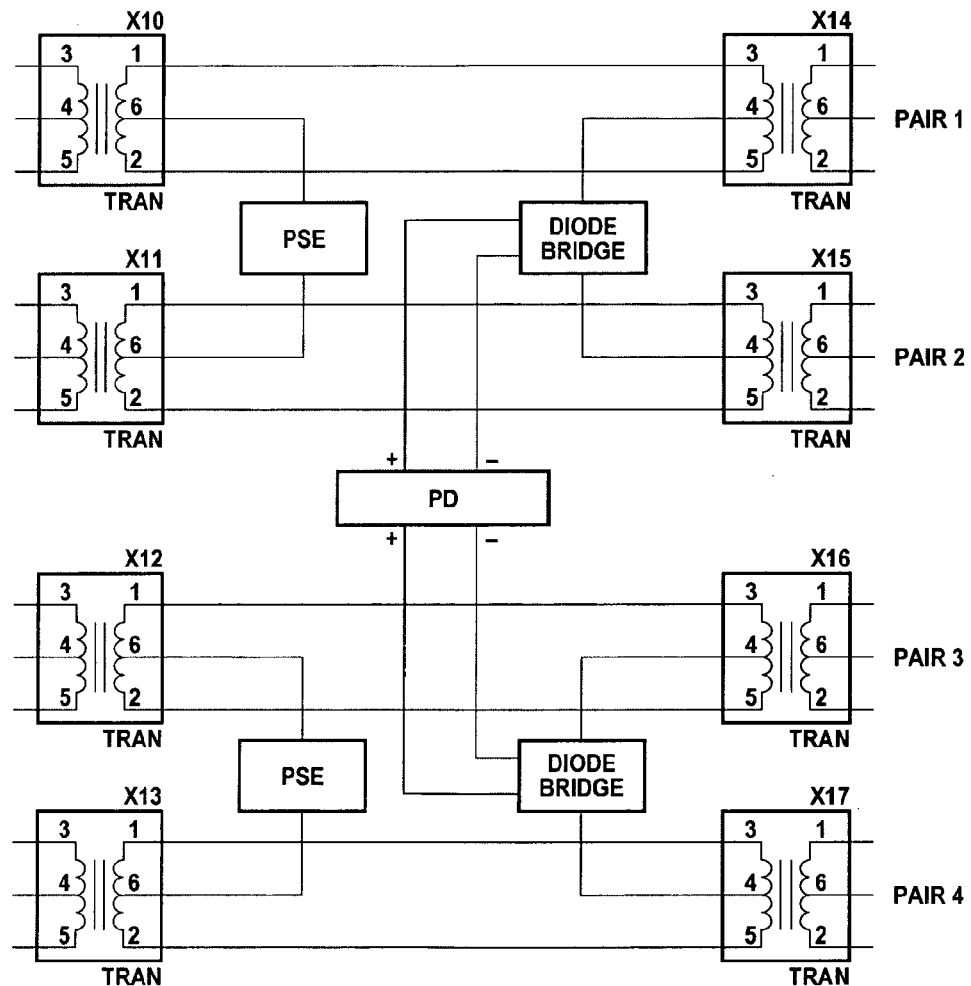
Figure 1E:
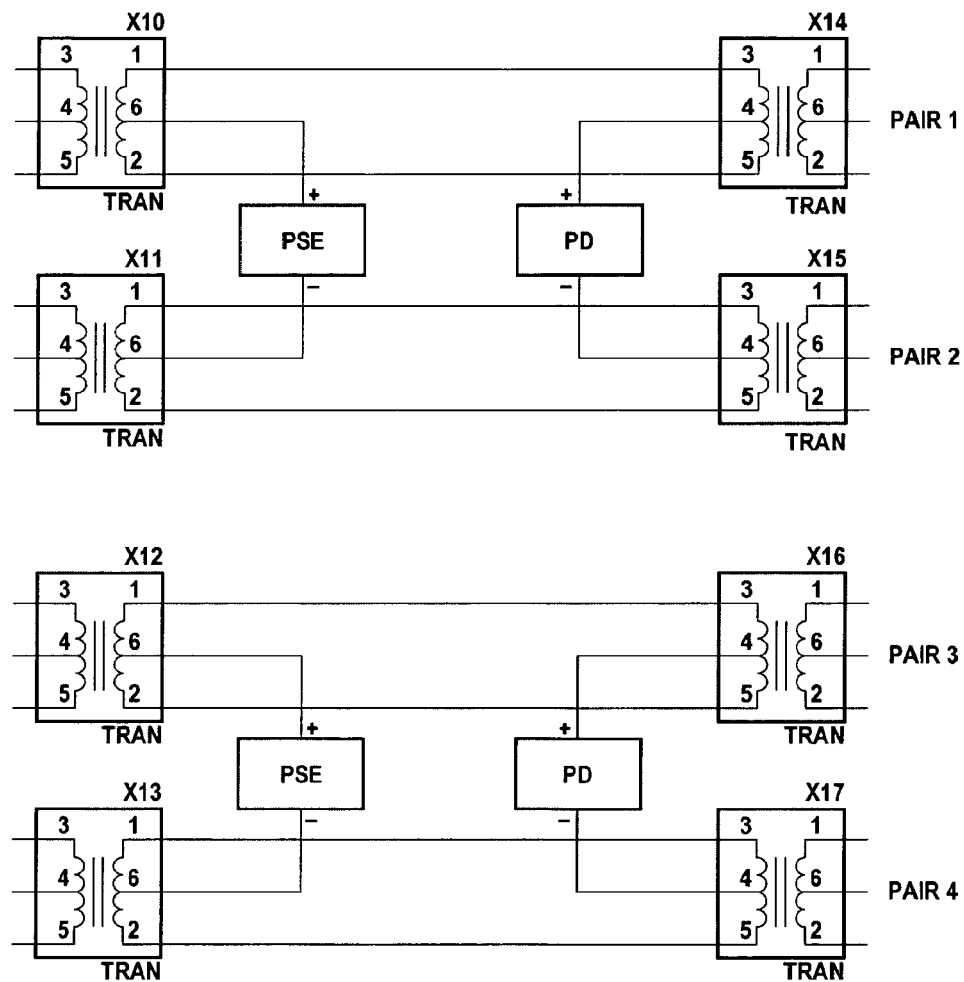
Figure 2:
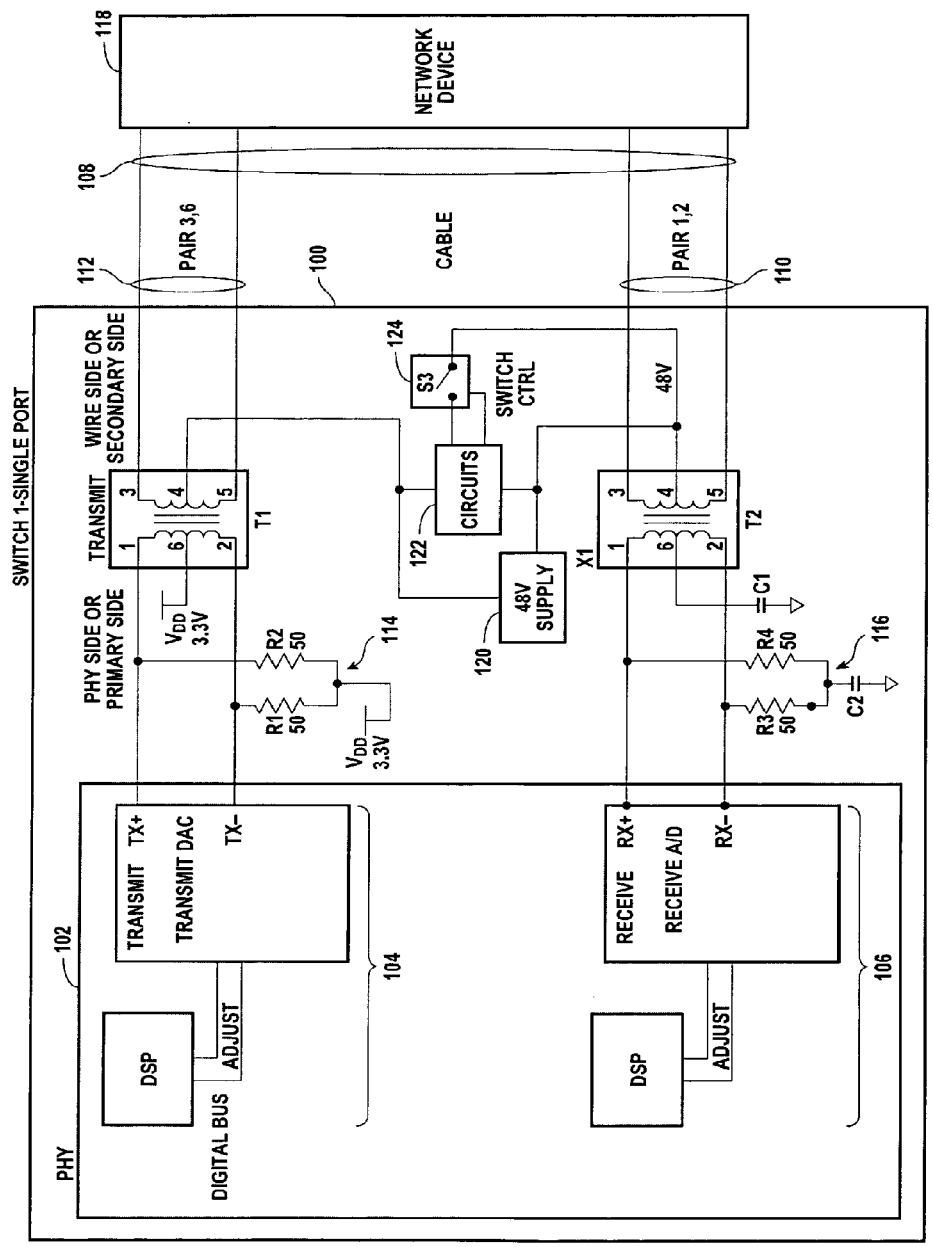
FIG. 2 is an electrical schematic diagram of a typical Ethernet 10/100 Base T connection in accordance with the prior art.

Turning now to FIG. 2 a typical 2-pair Ethernet (10 Base T, 100 Base T and 1000BT if 4-pairs were used) connection is illustrated. Box 100 encompasses the Ethernet port as it might exist in a network device such as a switch, hub, router or like device. Within port 100 is a PHY or physical layer device 102 which includes transmit circuitry 104 and receive circuitry 106. The transmit circuitry 104 interfaces to a connector such as an RJ-45 connector (not shown here) and through the connector to a cable 108 which includes at least two pairs of conductors, the Pair 1-2 (110) and the Pair 3-6 (112). The interface between the transmit circuitry 104 and the cable 108 includes a center-tapped magnetic device such as transformer T1. T1 has a PHY-side including pins 1 and 2 and center tap 6, and a wire side including pins 3 and 5 and center tap 4. The PHY side is also referred to as the primary side; the wire side is also referred to as the secondary side of the magnetic device T1. Termination circuitry 114 provides a Vdd bias (here illustrated as +3.3VDC) to the primary of T1. The secondary of T1 is coupled to cable pair 112 which is, in turn, coupled in operation to a network device 118 which may be another hub, switch or router or a PD such as a Voice Over Internet Protocol (VOIP) telephone or other network device.

The interface between the receive circuitry 106 and the cable 108 includes a center-tapped magnetic device such as transformer T2. T2 has a PHY-side including pins 1 and 2 and center tap 6, and a wire side including pins 3 and 5 and center tap 4. The PHY side is also referred to as the primary side; the wire side is also referred to as the secondary side of the magnetic device T2. Termination circuitry 116 provides a ground bias to the primary of T2. The secondary of T2 is coupled to cable pair 110 which is, in turn, coupled in operation to a network device 118. If the pairs of conductors shown belonged to a 1000 Base T wired data telecommunications network segment then each pair would transmit and receive at the same time and all four pairs in the cable would be used.

Center tap pins 4 of T1 and T2 are coupled to inline power circuitry including a 48 VDC power supply 120 for providing Inline Power over cable 108, control circuitry 122 and switch circuitry 124.

Figure 3:
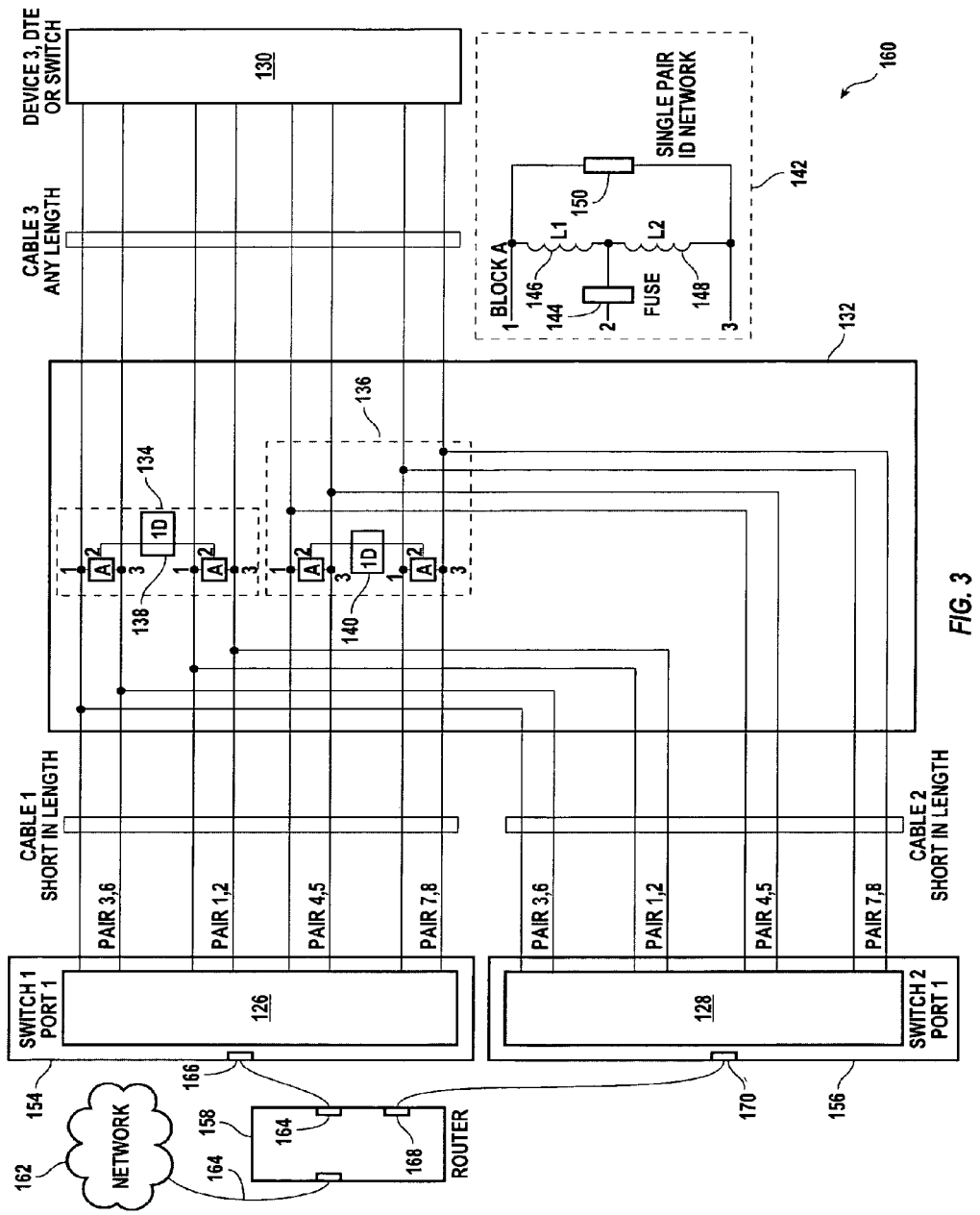
FIGS. 3, 4, 5, 6, 7, 8, 9, 10, 11, 12 and 13 are electrical schematic diagrams of a portion of a wired data telecommunications network segment incorporating redundancy in power and/or data through use of a Y circuit in accordance with various embodiments of the present invention.

Turning now to FIG. 3, an electrical schematic diagram illustrates a portion of a network segment including a redundancy circuit for coupling a first port 126 of a first network device (first network device) such as a hub, switch, router or like device and a first port 128 of a second network device (second network device) to a first port 130 of a third network device which is a device supported by redundancy provided by port 126 and port 128. A "Y device" 132 (sometimes referred to herein as a "Y") couples the conductor pairs (typically unshielded twisted pairs (UTP) but may be shielded twisted pairs (STP) or other types of conductors known to those of ordinary skill in the art) so that at least two pairs and, in some embodiments, all pairs of the four conductor pairs (Pair 3-6, Pair 1-2, Pair 4-5 and Pair 7-8) are coupled in a Y fashion as illustrated (i.e., each conductor is coupled so that it has three ends—one at each leg of the "Y"). The ends may be directly connected to devices or coupled to devices through connectors such as RJ-45 connectors. This approach does not use switches or switch-like elements to select one of port 126 and port 128. Rather, it shorts each conductor so that it is coupled to ports 126, 128 and 130 all at the same time. It relies on the requirement that the cabling between the Y device 132 and the respective ports 126 (Cable 1) and 128 (Cable 2) be kept relatively short (on the order of less than about 0.5 meters for 10BaseT and less than a few inches for 100BT and higher) note that the higher the speed of the network, the shorter the cables have to be kept). This avoids the stub attenuator effect that would tend to significantly attenuate the signals carried on Cable 1 and/or Cable 2. Cable 3, which couples the Y device 132 to the port 130 may be of any normal length appropriate for the wired data telecommunications network.

One or more identity networks may be provided at the Y device 132 in order to provide it with Inline Power, possibly to light an indicator light such as a light emitting diode (LED) to indicate the presence of Inline Power at the Y device 132. Circuit blocks 134 and 136 provide such an identity network. In Circuit block 134 associated with Pair 3-6 and Pair 1-2 an identity network 138 is provided. It is coupled to circuit blocks A (shown in detail at circuit block 142). It may include an inline resettable fuse 144 (provided for circuit protection) and a pair of inductors 146, 148 which tap the DC current from the conductor pair without interfering with any AC (data) signal which may be present. A single pair identity network 150 may also be provided so that the pair may be independently powered, if desired. Circuit block 136 is associated with Pair 4-5 and Pair 7-8 and it is in all significant respects the same as circuit block 134.

The identity networks 138, 140 may be a single resistor, a resistor and a pair of diodes, or other passive or active networks of electrical components. Inline power may be provided to the Y device 132 and port 130 from either or both of ports 126 and 128 over the Pair 3-6 and Pair 1-2 conductors, or, alternatively, from port 126 over the Pair 3-6 and Pair 1-2 conductors and from port 128 over the Pair 4-5 and Pair 7-8 conductors (a better choice for redundancy) where applicable. An example of such an identity network is illustrated, for example, at FIG. 17.

Port 126 is part of a first network device 154 and port 128 is part of a second network device 156. A router 158 couples network segment 160 to a larger network 162 such as a local area network (LAN), metropolitan area network (MAN) or wide area network (WAN) such as the Internet or a corporate Intranet or the like. The link 164 coupling router 158 to network 162 may be any suitable network link such as Ethernet, fiber, a satellite link, a terrestrial wireless link and the like. Router 158 may be any device capable of providing data redundancy to first network device 154 and second network device 156. The idea here is to couple port 164 of router 158 to the network port 166 of first network device 154 and port 168 of router 158 to the network port 170 of second network device 156. The packets of data sent to first network device 154 should be essentially the same as those going to second network device 156, except that the specific media access controller (MAC) addresses in the packet headers will be different in most cases (although this is not required). Although a particular network configuration is illustrated using a router to provide the two streams of identical signals to the respective redundant network devices (such as switches), other configurations that accomplish the same result are intended to be within the scope of this invention. Each network device 154, 156 operates in an embodiment of the present invention like a network switch with a number of ports. Note that the physical embodiment of network devices 154, 156 may be such that they are separate line cards in a larger device, preferably running off of separate power supplies for redundancy. They may be (but are not required to be) built into the same box or rack as Y device 132 for ease of installation. FIG. 3 illustrates support for 10/100/1000 Base T Ethernet (2 or 4-pairs) and power redundancy from 2 sources over either 2-pairs or 4-pairs.

Figure 4:
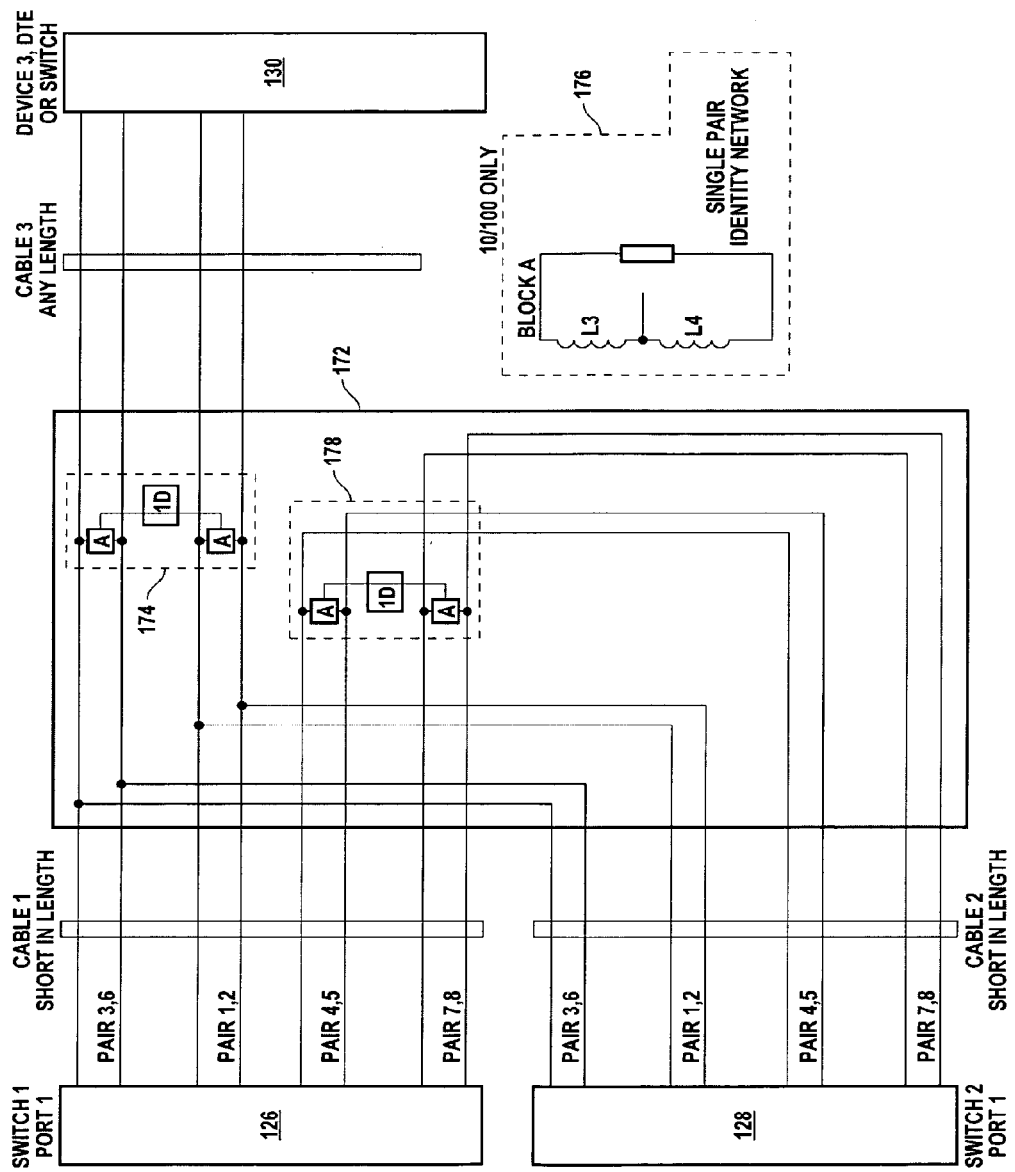

Turning now to FIG. 4, a 10/100-only redundancy connection is shown where the Y device 172 uses two of the four pairs of conductors for redundancy to port 130 and the other two pairs for communication between the two redundant ports (126, 128). Pair 3-6 and Pair 1-2 are wired as in the embodiment illustrated in FIG. 3. Circuit block 174 utilizes power tap circuits 176 (which can be the same as circuit block 142 from FIG. 3) to obtain local power (if needed). The cables from the Y device 172 to ports 126, 128 are short as in the FIG. 3 embodiment. Pair 4-5 and Pair 7-8 are wired differently here. In this case they are wired to provide a direct link, via the Y device 172, between ports 126 and 128. This allows the communication of information between ports 126 and 128 (such information including, but not limited to, for example: error detection and recovery, management, status exchange, and control). If desired, they may have circuit block 178 disposed across them to provide redundant inline power to Y device 172, although this is not required. In this way the network devices associated with ports 126 and 128 may obtain such information regarding each other. In this way, one can assert that it is the master and the other the slave, the master serving as the operative network device until the slave (or master) detects a problem and switches primacy to the slave.

Figure 5:
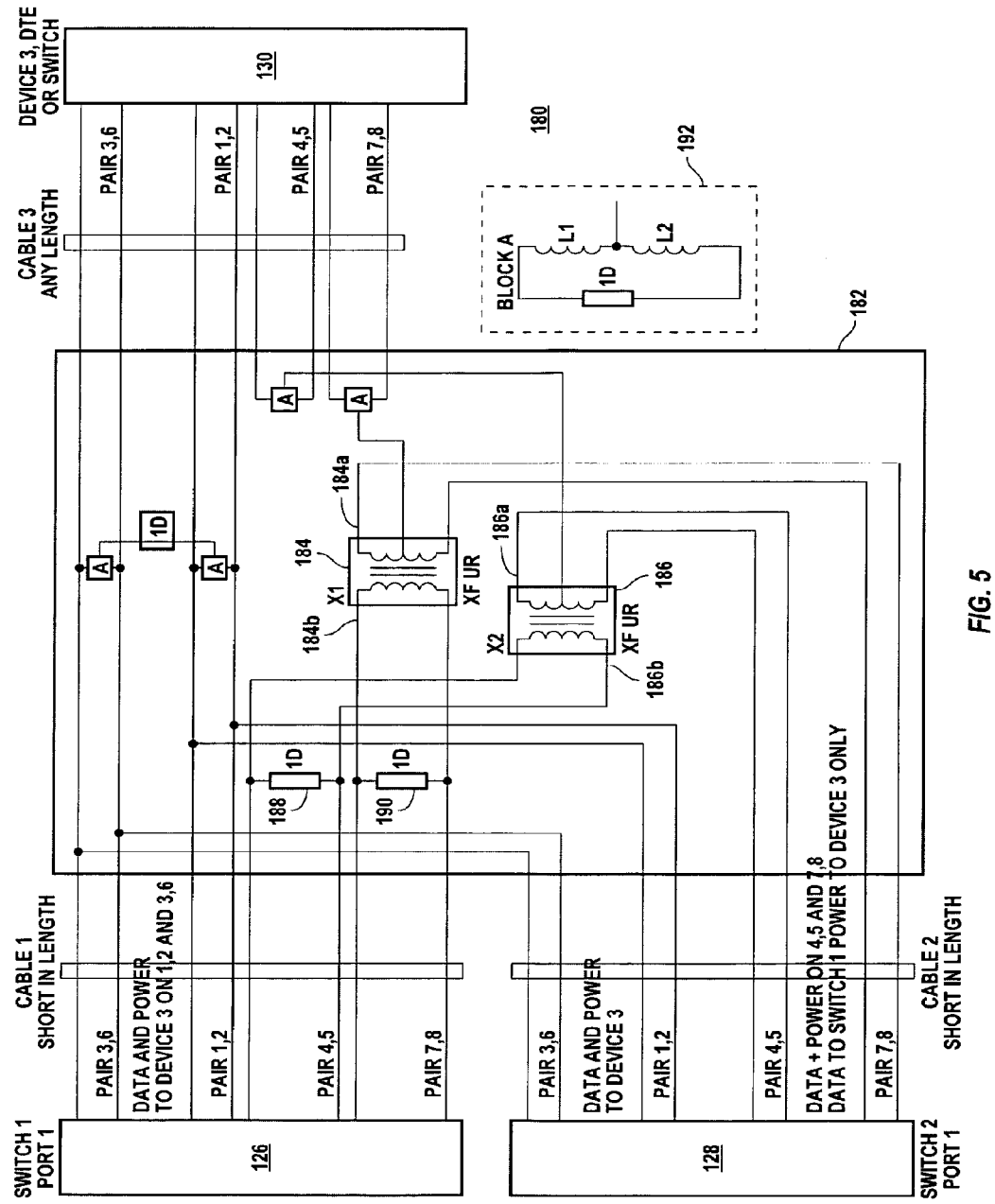

Turning now to FIG. 5, an embodiment 180 of the invention for use in 10/100 Base T networks is illustrated where port 130 is powered with four pairs of conductors. Pair 3-6 and Pair 1-2 are coupled through Y device 182 to port 126 and port 128 of redundant network devices. Power over Pair 4-5 and 7-8 is coupled into Pair 4-5 and Pair 7-8 of port 130 via first windings 184*a* and 186*a* of center tapped transformers 184, 186 as shown. Second windings 184*b* and 186*b* couple data back to the other of the two network device ports 126, 128. A single pair identity network 188, 190 associated with Pair 7-8 and Pair 4-5 at the Y device 182 permits the attached ports 126, 128 to ascertain the nature of the Y device 182. The block "A" circuits may be as shown at circuit block 192. As with the FIG. 4 embodiment, the network devices associated with ports 126 and 128 may obtain status, control and link management information regarding each other over the Pair 7-8 and Pair 4-5 link which provides a full 10/100 Base T connectivity. Transformers 184, 186 provide isolation so that data can pass through but inline power cannot. In this way, one can assert that it is the master and the other the slave, the master serving as the operative network device until the slave (or master) detects a problem and switches primacy to the slave. Data can be provided from one network device at a time but power is available from both at all times (if present). Here, the inline power may be configured as IEEE 802.3af midspan power and use the IEEE 802.3af discovery process.

Figure 6:
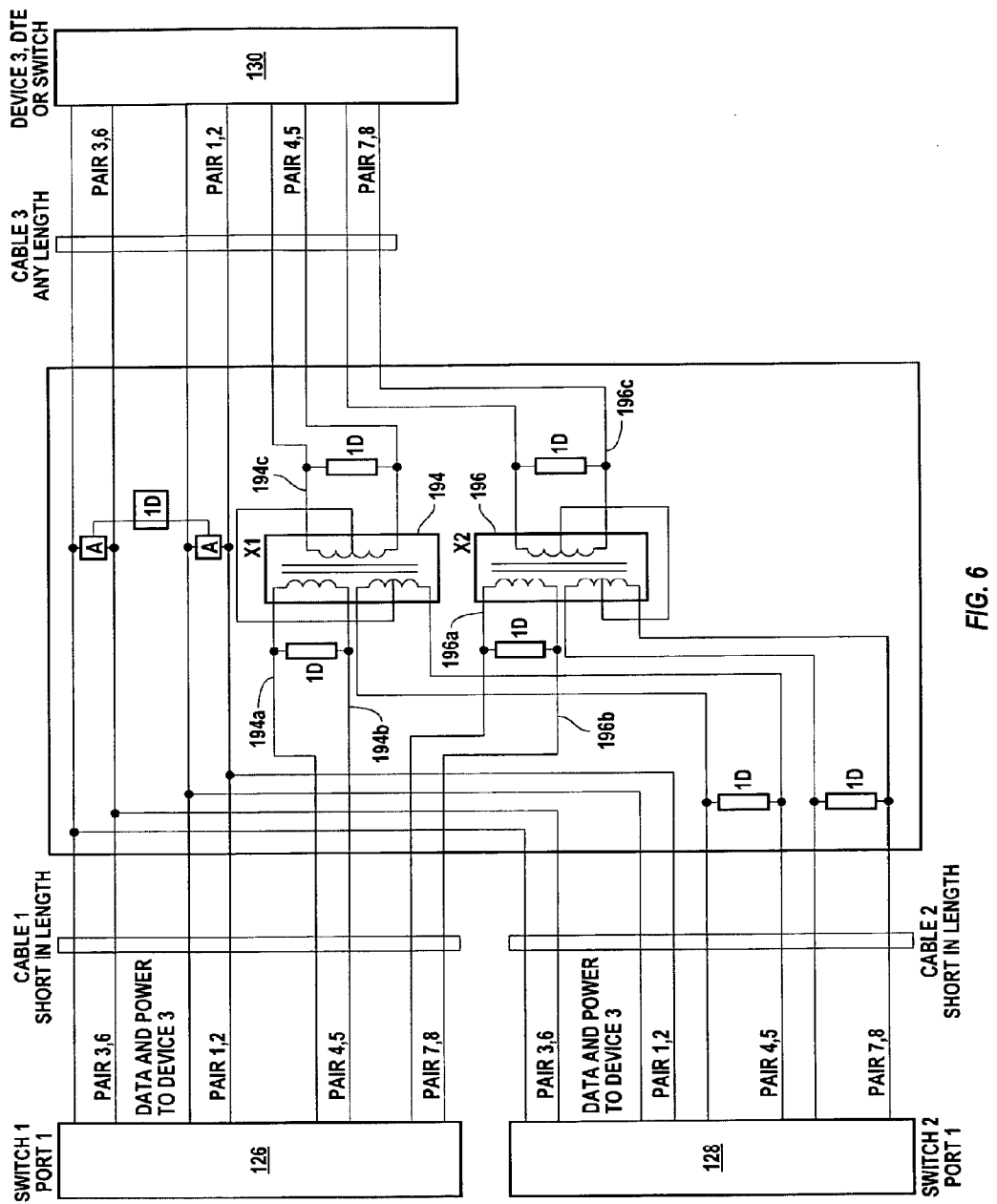

Turning now to FIG. 6, a modification of the FIG. 5 embodiment is presented where the isolation transformers 184, 186 are replaced with alternative isolation transformers

194, 196. Isolation transformers 194, 196 each have three windings (they are 1:1:1 transformer winding ratio transformers). The first and second windings 194a, 194b on the primary side of transformer 194 are coupled respectively to Pair 4-5 of port 126 and Pair 4-5 of port 128. Third winding 194c on the secondary side of transformer 194 is coupled to Pair 4-5 of port 130. Similarly, windings 196a, 196b and 196c are coupled to Pair 7-8 of port 126, Pair 7-8 of port 128, and Pair 7-8 of port 130. Such a three-way magnetic device has a typical −3 db loss of signal and can have up to −6 db loss in certain configurations. It is used to pass inline power from the network devices' ports 126, 128 to the third network device's port 130 via the shorted center taps as shown and to enable each of ports 126, 128 to hear the conversation going on between the third network device port 130 and the other port (i.e., port 126 can hear port 130-port 128 conversations and port 128 can hear port 126-port 130 conversations in this way. In other respects FIG. 6 is like FIG. 5.

Figure 7:
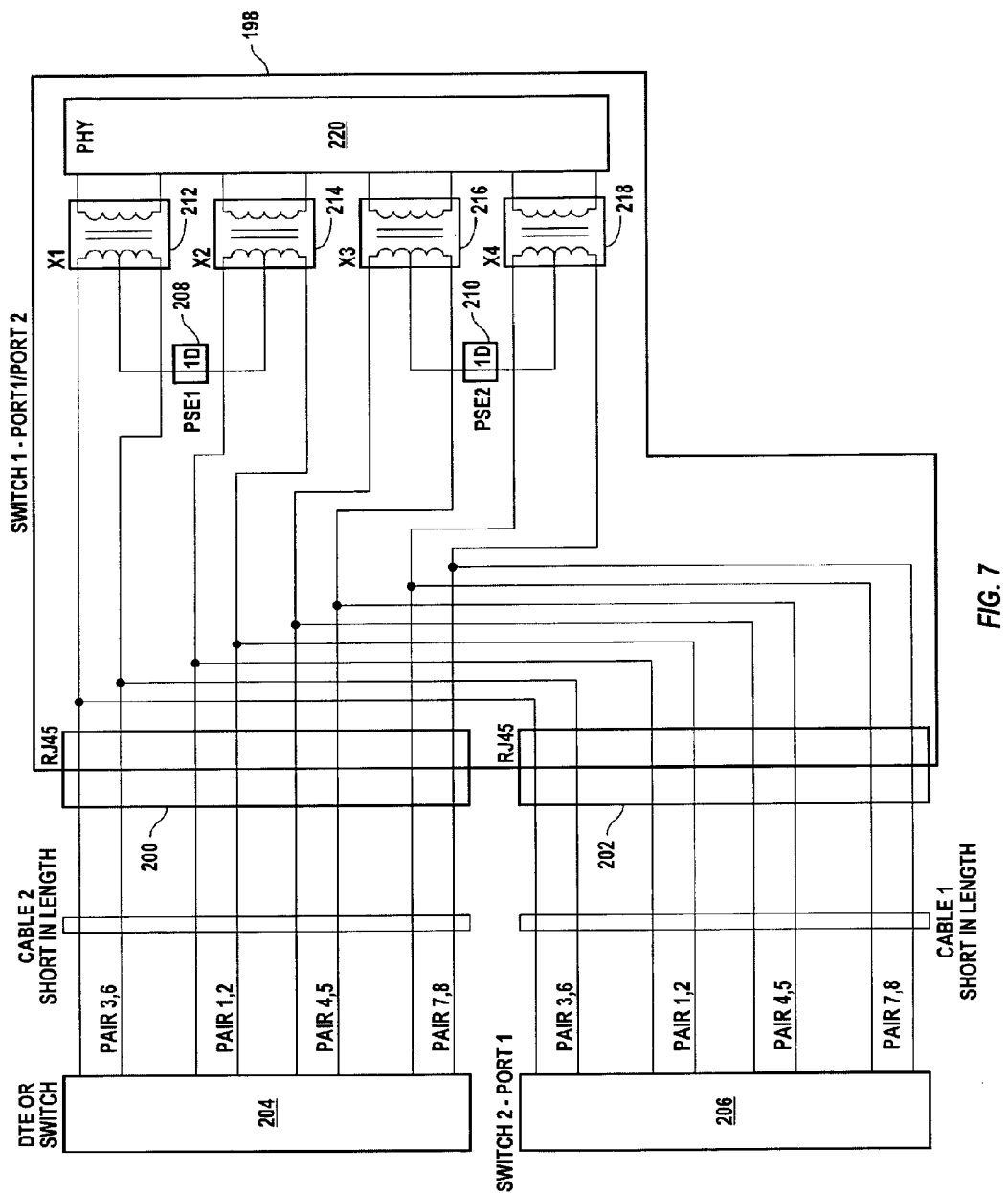

Turning now to FIG. 7, this embodiment differs somewhat from the foregoing embodiments. Here a first network device 198 (sometimes referred to as switch 1) has a pair of ports with connectors 200, 202 (which may be RJ-45 type connectors). Connector 200 is coupled via cable 2 (any length) to data terminal equipment (DTE) or switch 3 (204). Connector 202 is coupled via Cable 1 (short length) to a first port (port 1) of second network device 206 (sometimes herein referred to as switch 2). Switch 1 (198) includes the Y circuitry for each pair and includes PSE circuitry 208, 210 for the four conductors of Pair 3-6 and Pair 1-2 as well as the four conductors of Pair 4-5 and Pair 7-8. Conventional PHY transformers 212, 214, 216 and 218 are provided and couple the conductors to PHY 220.

Figure 8:
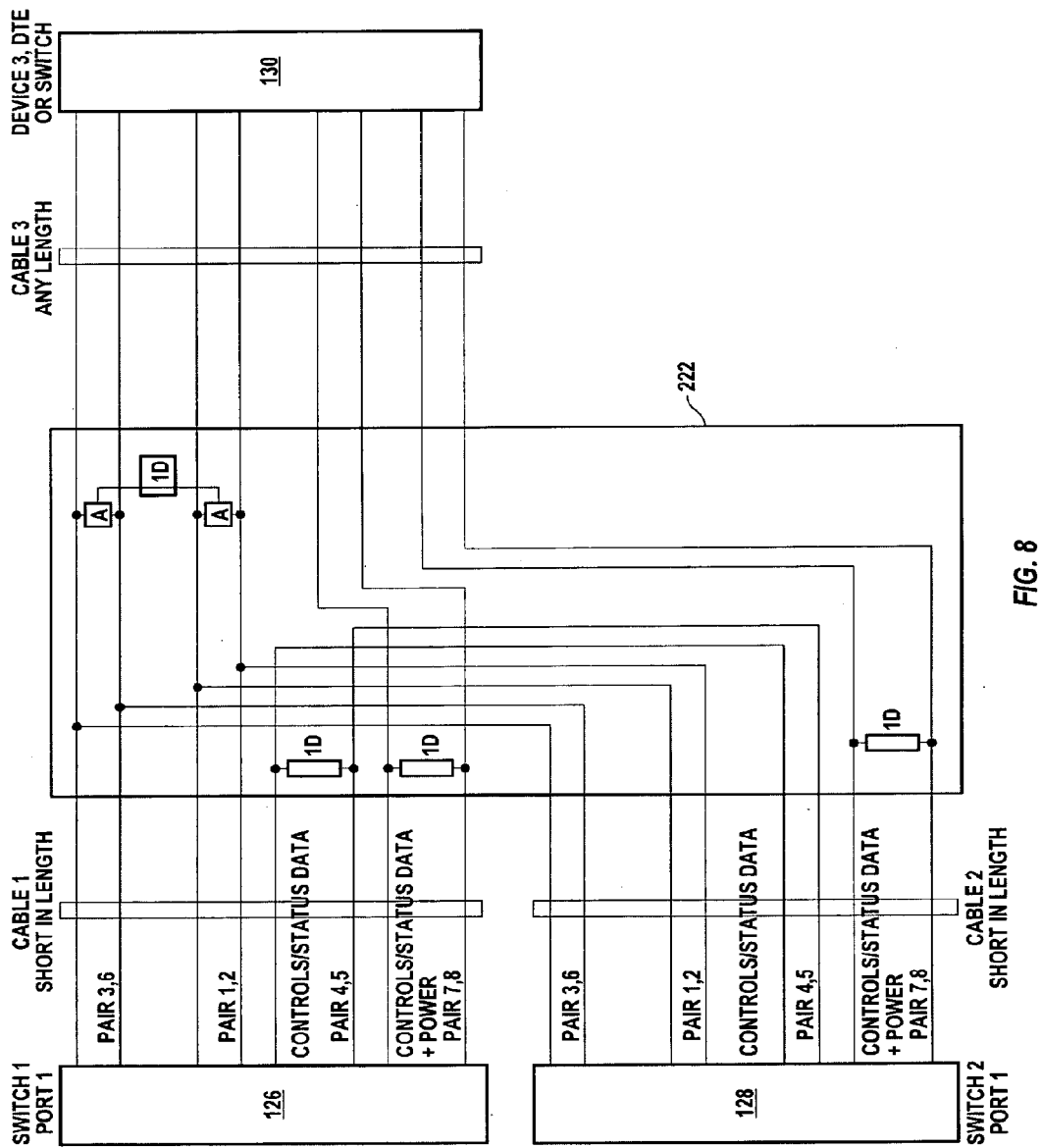

Turning now to FIG. 8, a 10/100 Base T embodiment is illustrated where each port 126, 128 has the Pair 3-6 and Pair 1-2 pairs Y-coupled in accordance with the present invention, but one of the 'unused' pairs for data transmissions (here Pair 4-5 but can be Pair 7-8) can be used for status and control or even one way half duplex communication between the two ports 126, 128, then the other unused pair in each switch is connected to port 130 by a pair through the Y device 222 allowing a one pair communication between the port 130 and each of ports 126, 128 for status and control information exchange. Such communication would be half-duplex in nature and may use any suitable communication technology. Such pairs will help in fault discovery, recovery, management of the link, status reporting, and feeding back inline power status at the third port 130. It may also be used to negotiate which switch should be the master, and the like. Providing inline power over a single pair, e.g., Pair 7-8, would entail having the proper support at the PD and the PSE since this would not be the system supported by the IEEE 802.3af standard. Extra devices would need to be provided in the PD to support this option, and it would co-exist with the IEEE 802.3af standard infrastructure.

Figure 9:
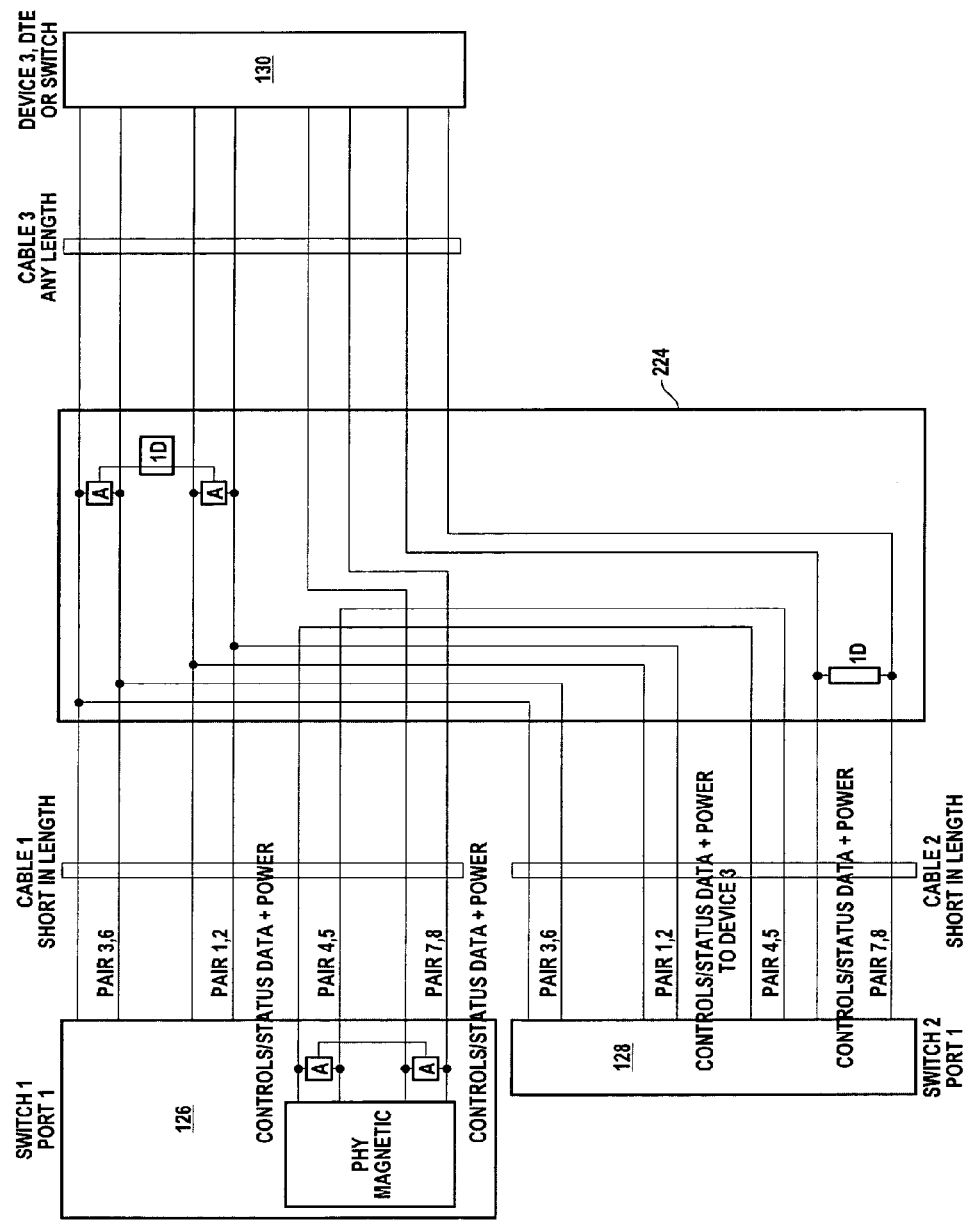

Turning now to FIG. 9, a variant on the embodiment of FIG. 8 is illustrated. In the FIG. 8 embodiment, a 10/100 Base T redundancy scheme uses Pair 1-2 and Pair 3-6 for power and data redundancy, but should the power supply on these pairs fail to a short circuit there would be no simple way to recover. In the FIG. 9 embodiment, the Y device 224 is wired somewhat differently so that switch 2 (port 128) supplies power from Pair 4-5 and Pair 7-8 by sending power to switch 1 (port 126) over Pair 4-5 and then switch 1 (port 126) passes the power to device 3 (port 130) while the other rail of the inline power from switch 2 (port 128) reaches device 3 (port 130) directly. Note how the common mode DC current is passed on within switch 1. Meanwhile Pair 4-5 serves as a single pair communication channel for status control and management between switch 1 and switch 2, while Pair 7-8 serves as a as a single pair communication channel for status control and management between switch 1 and device 3.

Figure 10:
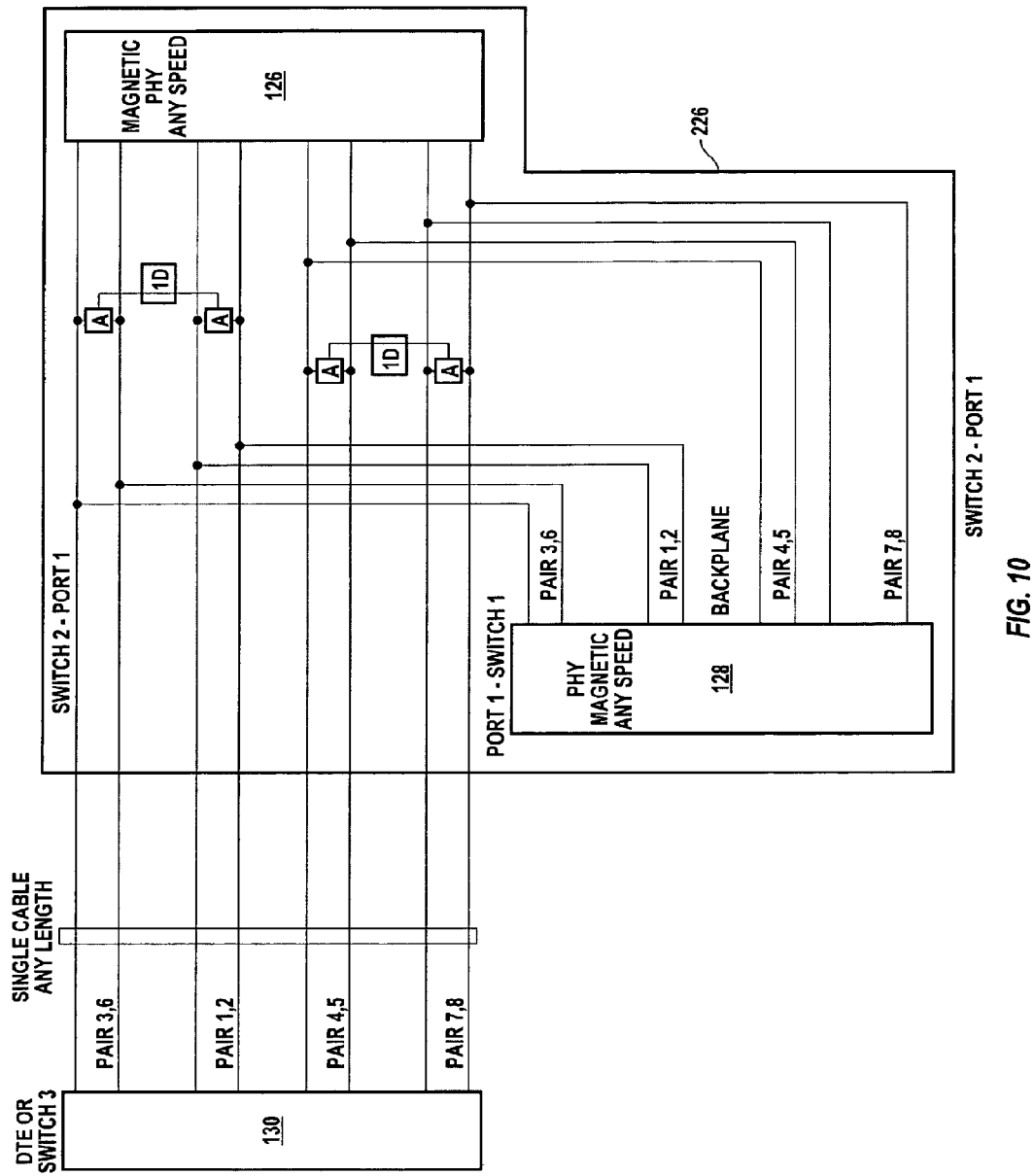

Turning now to FIG. 10, a "backplane" or similar type of redundancy configuration is provided. Device 226 includes a port 126 (switch 2) and a port 128 (switch 1) which are coupled together in a Y configuration. Separate power supplies, data control and software/firmware may support each switch. A third port 130 associated with DTE or another switch is coupled to device 226. Thus switch 1 and switch 2 are fully redundant and can respond to a failure of the other to provide redundant power and data to port 130.

Figure 11:
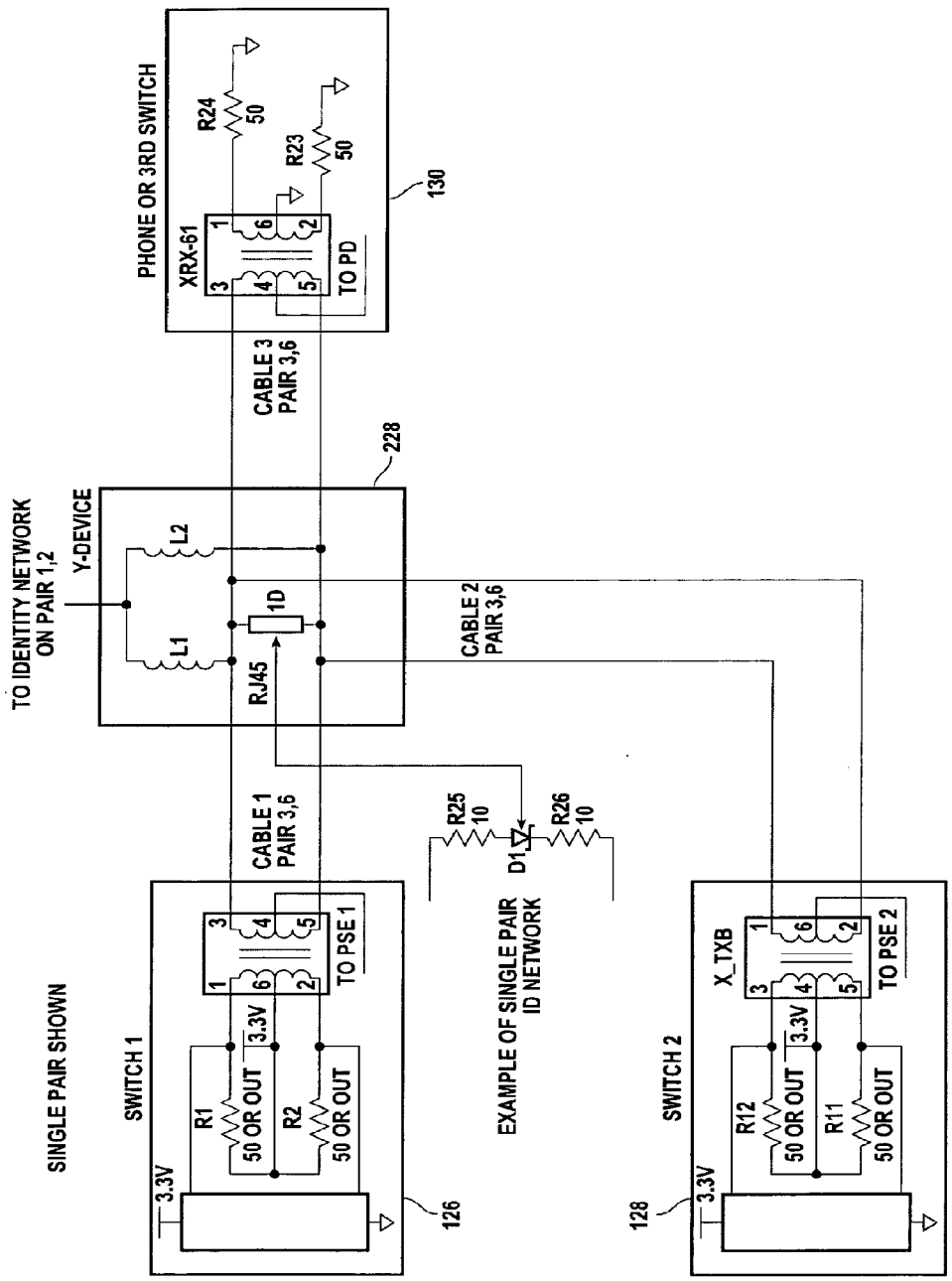

In order for the Y device configurations discussed herein to work optimally, the impedance seen by the various devices must always approximate the 100 ohms of the characteristic impedance of the Ethernet cable (where another type of cable is used, its characteristic impedance must be used). In FIG. 11 three ports are shown connected in a Y device configuration. They are port 126 of switch 2, port 128 of switch 1 and port 3 of device 130. Cable 1, Pair 3-6 couples port 126 with a Y device connection jack 228; cable 2, Pair 3-6 couples port 128 with the Y device connection jack 228; cable 3, Pair 3-6 couples port 130 with the Y device connection jack 228.

Figure 16:
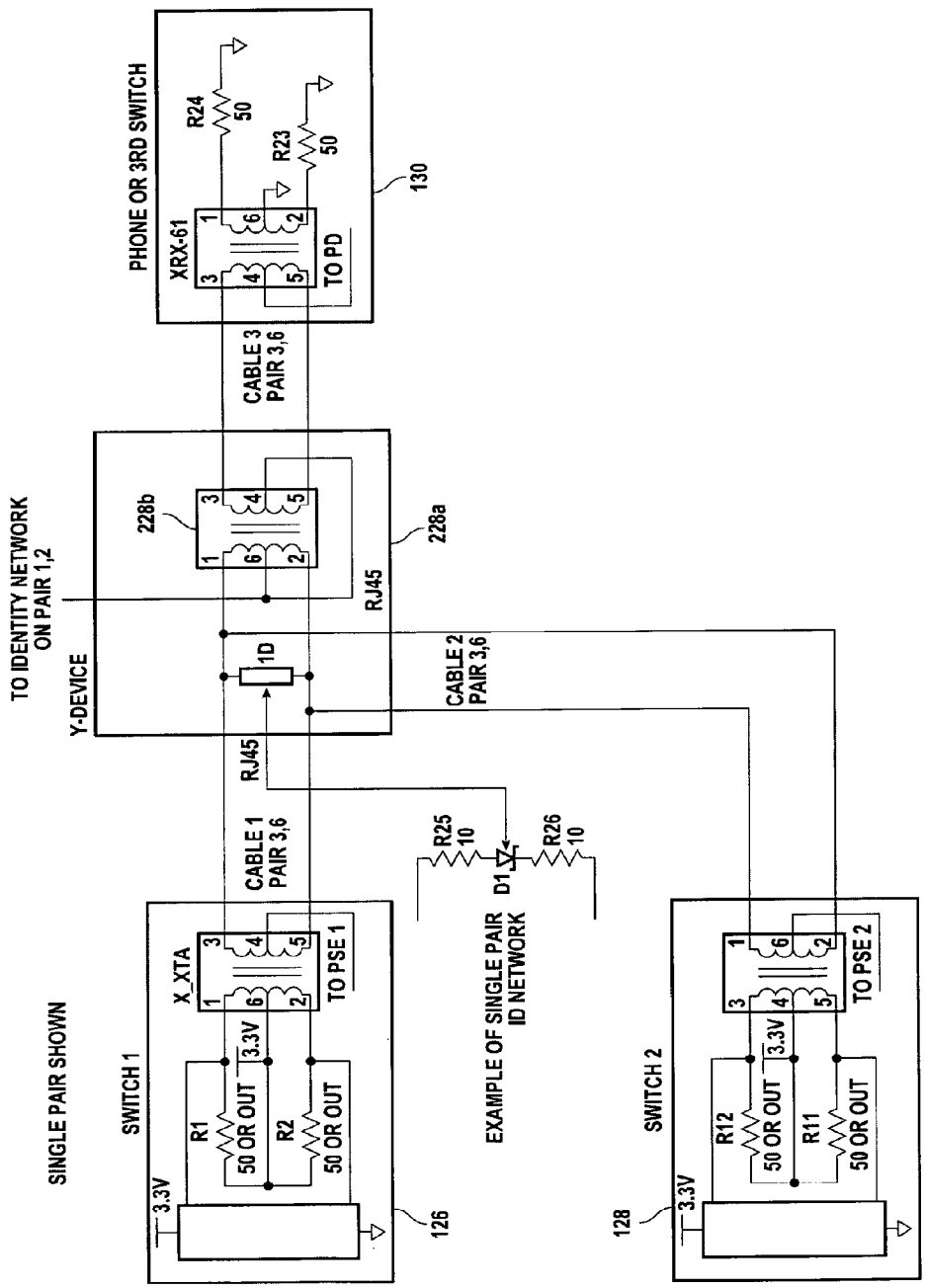

If all three devices are connected through Y device connection jack 228 then the termination in one switch needs to scale up to high-impedance across the pairs, to keep the total termination seen into the Y device connection at the third network device a total of 100 ohms. One option includes keeping switch 1 at 100 ohms termination impedance and forcing switch 2 into a high-impedance (e.g., more than 1000 ohms) termination impedance so that switch 2 is effectively put into a receive-only mode. It is possible to allow cable 1 and cable 2 to be much longer in length physically, however, in that case the impedance of the pairs must be higher (e.g., 200 ohms rather than 100 ohms) and the termination impedance in the switches must be higher (e.g., 200 ohms instead of 100 ohms) in order for both switches to receive data. This will keep the 100 ohms due to cable 3 properly terminated and allows successful data delivery to both receivers (10/100 only). Also (referring to FIG. 16) a 100 ohm to 50 ohm magnetic 228b may be inserted in circuit block 228a (which contains the Y device in this embodiment) to allow the matching of the 100 ohms facing the third network device to the two-parallel 100 ohm terminations seen at the switches and in cable 1 and cable 2 at the cost of a signal loss (i.e., −3 db of attenuation) but the impedance would be matched and both switches can receive at shorter cable length (for cable 3 plus the additional cable 1 or cable 2 total physical length).

Both switches now can leave their termination at 100 ohms. For switch based transmission matching, where two transmitters are sharing the same pairs, a 1:1:1 magnetic replacing magnetic 228b in the Y device, may be employed to enable easy matching and longer cable 1 and cable 2 physical length at the cost of about 3 db amplitude loss (up to 6 db loss in some configurations), but this allows both switches to leave their impedance at 100 ohms. Other configurations in impedance matching may exist to allow the sharing of a single cable for data delivery where cable 1 and cable 2 need to be much longer in length.

When one of cables 1, 2 or 3 is disconnected from the Y connection jack 228 there will necessarily be a change in impedance. A PHY equipped with a TDR (time domain reflectometer) will, in that case, detect the new impedance imbalance either via its TDR capability or just by sensing the change in voltage on it own transmitted signal (if it is equipped with a self-monitoring receiver circuit). It may then change its termination to 100 ohms across the pairs until the unplugged cable is plugged in again as described in detail below.

In the FIG. 11 configuration cables 1 and 2 are short in length (e.g., less than about 0.5 meter for 10BaseT and few inches in length for 100 Base T and higher), so as to not cause the other Ethernet ports to see an effective 100 ohm termination (avoiding cable length alone causing an 'effective termination' to be reflected into the cables coupling the other 2 devices and keeping ISI (inter symbol interference) under control as to not induce jitter or cause the transmit eye to loose margin resulting in increased probability of errors due to stub reflections). Note that the maximum length of the short cables is speed-dependent, i.e., the faster the underlying data rate, the shorter the maximum acceptable length of the short cables.

Figure 12:
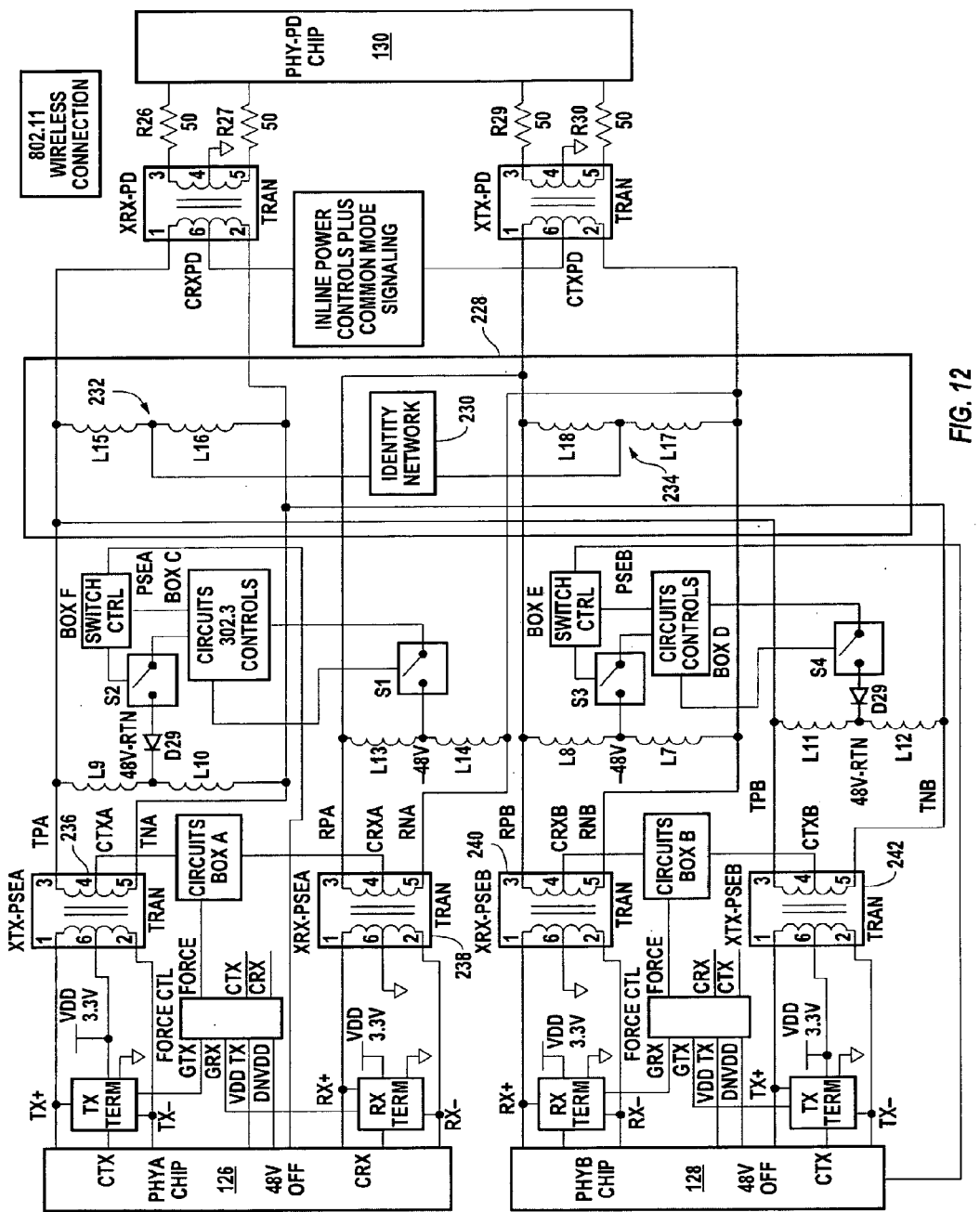

Turning now to FIG. 12, a more detailed schematic diagram of the FIG. 11 embodiment is shown having two pairs per port. Some of the details of an IEEE 802.3af standard inline power implementation are also shown although any inline power scheme may be used. This figure will be used to illustrate how the termination at the PHYs is dynamically changed in response to the attached cables to reconfigure the impedance for successful data transfer.

In FIG. 12 two sets of pairs from two different switches and the third network device (such as a VOIP telephone) is shown for data and power. Note that in this case, power may be supplied from both switches (PSEA and PSEB) at once, i.e., a hot-standby configuration is provided when both are powered without worrying about which one supplies the PD with power at a specific instant and what the percentage is, i.e., they share the load. For the purpose of sharing the load, the inline power sources are diode-OR-ed, i.e., a diode is placed in series with each one inside the PSE (diodes D28 and D29).

One of the PSEs may see the total load while the other delivers no current (since the supply voltage may be slightly different at each PSE), thus it would need to know to keep its power up (for backup purposes), otherwise it assumes the load is gone and it would shut down its 48 VDC supply (when in fact the load exists but it is drawing its current from the other PSE). To avoid this problem the PHYs may be used. When the PHYs detect a 100 ohm impedance again after power-up and when the link has been operational, a check may be performed on the status of current drawn and, if it is zero, the 48v is turned OFF, also a 'link' down (link is a logic state within the PHY that indicates that the far end device has been absent, since the local receiver has not seen any energy for a predetermined amount of time in accordance with the IEEE 802.3 standard) condition on a local PHY's RX pair coupled with a TDR check indicating an open cable (high-impedance) on the local PHY's TX pair would indicate an unplug justifying power down of the inline power supply at the corresponding PSE. Another way to accomplish such a check would be to sense for the presence of any pseudo valid signals at the receiver indicating the presence of a far end device, even though the link state is down (i.e., the PHY does not receive the exact number of symbols to validate the far end device and bring the link state up).

PSEA may determine that a valid PD is attached and that it should power up to provide inline power to the PD even if PSEB is already up as follows. Each PSE needs to have a back off algorithm where it does not conduct IEEE discovery for a period of time so that they do not both attempt to do so at the same time. Such back off algorithms are well known to those of ordinary skill in the art. Instead, PSEA performs a high-impedance sense of the cable in search of already-present 48 VDC inline power signals and IEEE 802.3af standard detection and classification signals (or the like) from a possible PSEB. Should it find regular inline power applied, PSEA would communicate with PSEB and an agreement would be reached to have the PSEA also turn its regular inline power on to provide a redundant or additional source of power to an attached third network device.

In the embodiment of FIG. 12 a 2-pair connection and the Y device 228 are shown. The Y device 228 shorts: (1) TX+ (TPA) of the TX pair of PSEA (also referred to as switch 1 or first network-device) to TX+(TPB) of the TX pair of PSEB (also referred to as switch 2 or second network device); (2) TX−(TNA) of the TX pair of PSEA to TX−(TNB) of the TX pair of PSEB (pair 1 referenced here would be Pair 3-6 and pair 2 would be Pair 1-2 as referenced in the RJ45 pinout); (3) RX+(RPA) of the RX pair of PSEA to RX+(RPB) of the RX pair of PSEB; and (4) RX−(RNA) of the RX pair of PSEA to RX−(RNB) of the RX pair of PSEB.

An identity network 230 is provided across the center taps of auto-transformers 232 and 234 providing PSEA and PSEB with common mode means to identify the connected Y device 228. The presence of the identity network 230 in the Y device 228 allows PSEA and PSEB to know that they are not connected to a one-to-one single-cable connection. Should the third cable coupling the Y device 228 to the third network device (i.e., port 130) be absent, then each PSE (A and B) looking into the Y device 228 with its respective cable will see a 100 ohm impedance. Note that single-pair identity networks may be used as well but have been omitted from this figure for clarity.

In addition to shorting the pairs as described above, there are circuit blocks labeled RX Term and TX Term associated with each of ports 126 and 128. These circuit blocks represent actively controlled terminations that can scale either up or down based on how many cables are attached to the Y device 228. They are described in more detail below.

Similarly there are circuit blocks labeled FORCE_CTL associated with each of ports 126 and 128. They are described in more detail below.

In FIG. 12 Switches S2 and S4 have been provided (they may be switches, relays, PMOS (P-channel Metal Oxide Semiconductor) or NMOS (N-channel MOS) power FETs (Field Effect Transistors), or the like) on the positive legs of the 48v inline power rail for the purpose of having a redundant way to shut the power down on a supply should the negative leg switches S1 or S3 fail to function or should the local PSE controller fail to function. Redundant PSE controls and status circuitry or the PHY could sense the failure in a conventional manner and then, optionally through an optoisolator (not shown), send a signal to force S2 or S4 off while allowing the device at port 130 to remain powered. Thus, if all of switches S1, S2, S3 and S4 are closed, redundant power is supplied from switches 1 and 2 to port 130. If S1 and/or S2 is opened then the PSEA associated with switch 1 is cut off. If S3 and/or S4 is opened then the PSEB associated with switch 2 is cut off. Note that the 48 VDC power supplies are not shown in FIG. 12 to improve clarity, but see, e.g., FIG. 2). Note that control and status circuitry for switches S2 and S4 may use a separate (on board) power supply and/or interface via an optoisolator to the grounded PHY domain to receive the proper signals to shut down S2 and S4 when the need arises.

The PSE's inline power circuitry may be implemented as circuit blocks "BOX A" (associated with port 126) and "BOX B" (associated with port 128) which are, in effect, in series with corresponding OR-ing diodes D29 and D28. The power from circuit blocks BOX A and BOX B may be applied directly at the center taps of the data transformers 236, 238 and 240, 242 as shown, or can be coupled through another set of auto-transformers (windings that looks like inductors for the purposes or delivering inline power only and are 'open' AC-wise for data transfer purposes) as shown.

Also note the connection from the FORCE_CTL circuit blocks associated with ports 126 and 128 to corresponding circuit blocks BOX A and BOX B illustrate the alternative means for the location of the PSE's inline power control circuitry but interface to the PHY across the isolation barrier since the 48v supplied in accordance with the IEEE 802.3af standard must be isolated, and we need an optoisolator (or an equivalent isolation technique) to communicate with the PHY and other circuitry around it, i.e., the termination controls in the TX TERM and RX TERM circuit blocks since they are referenced to system ground.

Thus the 2-pairs shown in FIG. 12 show that the Y device 228 operates symmetrically and it effectively shorts or connects the lines designed to be 100 ohm differential impedance while handling the DC current required by inline power. It also provides isolation of at least −40 db pair to pair to insure that the Y device 228 keeps the signal from being contaminated by crosstalk between pairs (which would disadvantageously increase the Bit Error Rate).

Should the cable to the slave be disconnected during data transmission one RJ45 connector becomes potentially hot, i.e., the 48 VDC may be present from the other PSE (because the cables are shorted via the Y device). An LED at the connector drawing no more than approximately 2 mA may be used to indicate the presence of such a hot connector, or other methods may be used. Overall, if a PSE is hot-plugged into another PSE no damage should occur, and the PHY differential data and pulse transmission will help the slave device come on-line once again.

Figure 13:
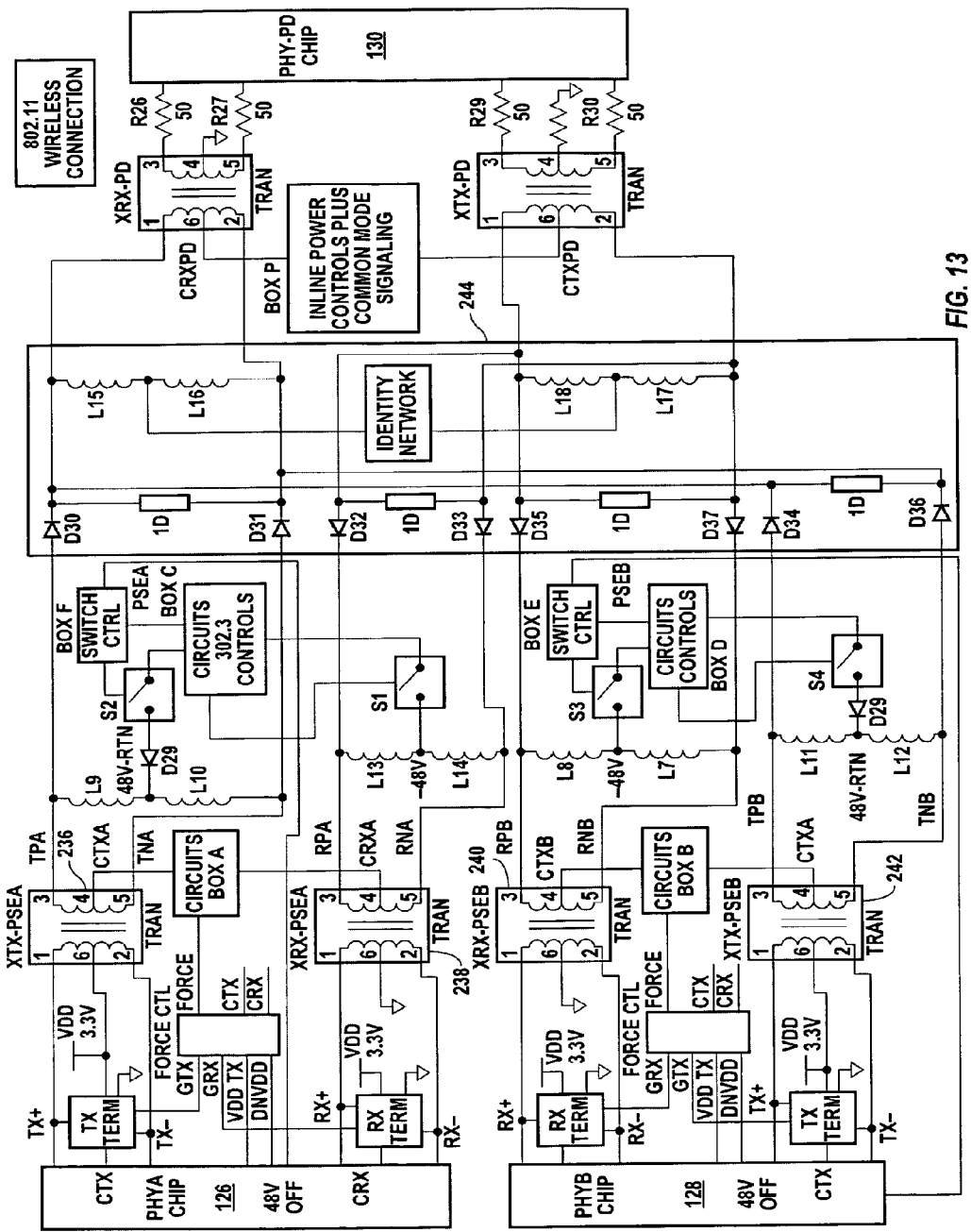

Alternatively, diodes D30-D37 of Y device 244 in FIG. 13 could be used to insure that there is no inappropriate hot connector or the appropriate power module could be shut down if any cable is ever removed. Or the power could be kept on but the connection monitored for an event that would draw too much instantaneous power and, in response, a quick shutdown could be implemented.

Figure 14:
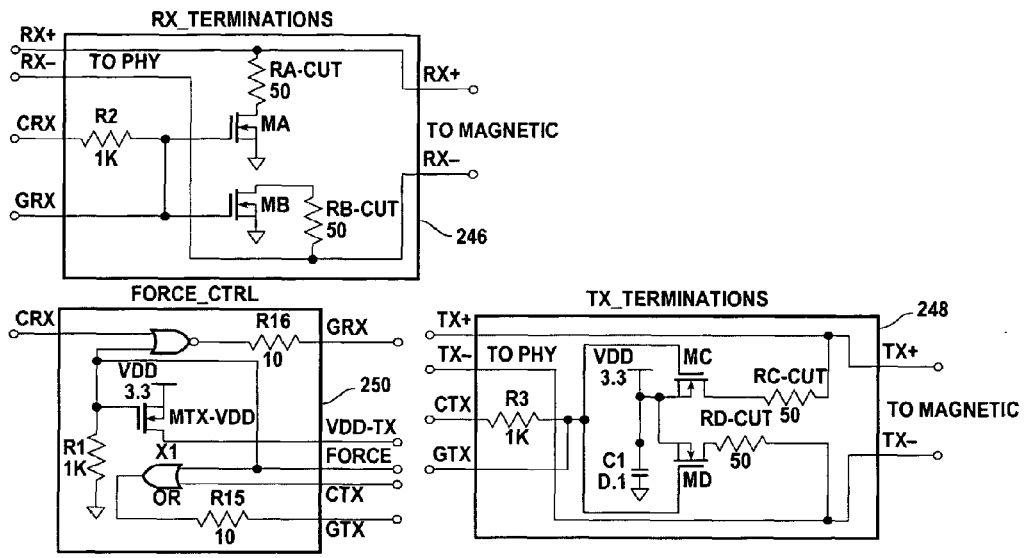
FIGS. 14, 15 and 16 are electrical schematic diagrams of circuits for dynamic impedance control in accordance with various embodiments of the present invention.

Turning now to FIG. 14, a schematic drawing illustrating the impedance changing network using PMOS and NMOS devices to switch in a set of resistors allowing the total impedance across a pair of conductors to be a low (e.g., 100 ohms) impedance or a high (e.g., 1000 ohms) impedance (i.e., the Y device is present and switch 2 is not loading the pairs). What is happening here is that with a 100 ohm characteristic impedance cable, the termination needs to look like 100 ohms. Conventionally this is achieved in a single-cable system with a pair of 50 ohm termination resistors at both ends of the link in a point to point connection. With a Y device coupling three cables together in a Y configuration, the total impedance still needs to look like 100 ohms but there are two shorted cables contributing to this on one end. With devices coupled to each leg, one of the cables may be terminated with a high impedance. With one device missing, the cables generally need to be terminated with a pair of 50 ohm resistors.

Accordingly, circuit block 246 of FIG. 14 is an RX termination network circuit block in accordance with an embodiment of the present invention. This termination network is referenced to ground and includes 50 ohm resistors RA-CUT and RB-CUT along with corresponding switches MA and MB. In most cases receiver terminations are referenced to ground, but they may be referenced to the positive rail of the power supply, e.g., 3.3 VDC. Similarly, most transmitter terminations are referenced to the positive supply rail (e.g., 3.3 VDC) but they may be referenced to ground if so designed.

The termination impedance may be switched to a 100 ohm termination by turning on the MA and the MB FETs. This couples the 50 ohm resistors on each side of the termination so that the termination impedance across the port is reduced to a total of 100 ohms (i.e., no Y or third network device or Y is present and this pair is in the master). This also corresponds to a legacy Ethernet data mode. The PHY controls the MA and the MB transistors, i.e., the PHY detects the presence of 2 or more devices and scales the impedance up or down, as appropriate. All of the components shown may be integrated into the PHY.

Circuit block 248 of FIG. 14 is a TX termination block in accordance with an embodiment of the present invention. It operates in essentially the same manner as circuit block 246, but referenced to Vdd rather than ground and uses PMOS devices that are normally on when the gate is logic low or zero volts in stead of NMOS devices.

Circuit block 250 is the FORCE_CTL block. Note the GRX signal generated from the output of NOR gate U1 in circuit block 250 can be activated by the FORCE signal (normally logic low) driven from the inline power circuitry through an optoisolator (not shown). FORCE is the first input into OR gate X1 and can be generated by another redundant circuit running off of some other power supply in the PHY. This provides a redundant means to force switches MA and MB OFF (taking RA-CUT and RB-CUT out of the circuit and making the termination high-impedance again) because the goal is to make sure the slave is high impedance since redundancy is more critical. I.e., the configuration of high-impedance mode is more important and may be the default since it is required for redundancy. Signal CRX is the second input into the NOR Gate U1 and is generated in the PHY and shown inverted (CRXBAR) going into the second input of the NOR gate U1. This is the normal way to switch the port's impedance up or down when the circuitry is functioning normally. The communication from the slave to activate the FORCE signal can come through any available port-port communication means such as common mode signaling between ports, a dedicated data link between the two switches, wireless communication, communication over available conductor pairs, a combination of the foregoing, and the like. A similar approach may be used to control the FETs MD and MC (PMOS devices) in switching the RC-Cut and RD-Cut in and out of the circuit to change the total impedance across the port between high-impedance and 100 ohms. Again, signal GTX can be activated either from the PHY normally via the CTX signal into second input of OR gate X1 and/or must respond to the FORCE signal going into OR gate X1 the same way the RX FETs do to insure a high-impedance termination.

The FORCE signal may be a last resort in the effort to make sure that the port's impedance, if impaired for any reason, is set up to allow the slave to use its high-impedance termination to keep the link going since the assumption is that the link was operational and there was a sudden failure that impaired either the TX or RX circuitry on the master. If the PHY in the broken switch does not respond to a command to back off (i.e., to keep its termination high-impedance and shut its transmitter down as if it cannot receive such a command at all, or cannot execute it), then the FORCE signal would insure that its transmitter is OFF, allowing the slave's transmitter to work properly without interference. The power of the master's transmitter is FORCEd off by pulling the gate of the PMOS MTX-Vdd FET (refer to the FORCE_CTL block 250) high and thereby causing the VDD-TX power of the PHY to be turned off. This would make sure that the MA and the MB FETs are also off by forcing their gates low regardless of what the PHY is driving into the CRX pin. This is a redundant way to recover from a single fault in the system that has the potential to disrupt communications The function of the RX Terminations (Block 246) operate in accordance with the following CRX truth table (TABLE II):

TABLE I

| CRX | TRUTH TABLE |
|---|---|
| Vdd | RA-CUT and RB-CUT are in circuit (MA, MB are ON) to provide 100 ohm termination rather than no termination - Legacy Ethernet connection or Y device is present and this pair is part of the master. |
| GND | RA-CUT and RB-CUT are both out of circuit (MA, MB are OFF) to provide high-impedance. Y is present but the current device is the slave. |

The function of the TX Terminations (Block 248) operate in accordance with the following CTX truth table (TABLE III):

TABLE III

| CTX | TRUTH TABLE |
|---|---|
| Vdd | RC-CUT and RD-CUT are both out of circuit (MC, MD are OFF) to provide no terminations - this is due to a Local pair being part of the slave. |
| GND | BA-CUT and RB-CUT are in circuit (MC, MD are ON) to provide 100 ohm termination rather than no termination of this is due to a Local port being legacy or a master. |

The function of the FORCE_CTL block 250 operates in accordance with the following truth table (TABLE IV):

TABLE IV

| SIGNAL | FORCE = GND | FORCE = Vdd | Notes When FORCE = GND |
|---|---|---|---|
| GTX | CTX | Vdd | GTX takes on value of CTX |
| GRX | CRXBAR | GND | GRX takes on value of CRX |
| Vdd-TX | Vdd | OFF | Supply is UP |

Figure 15:
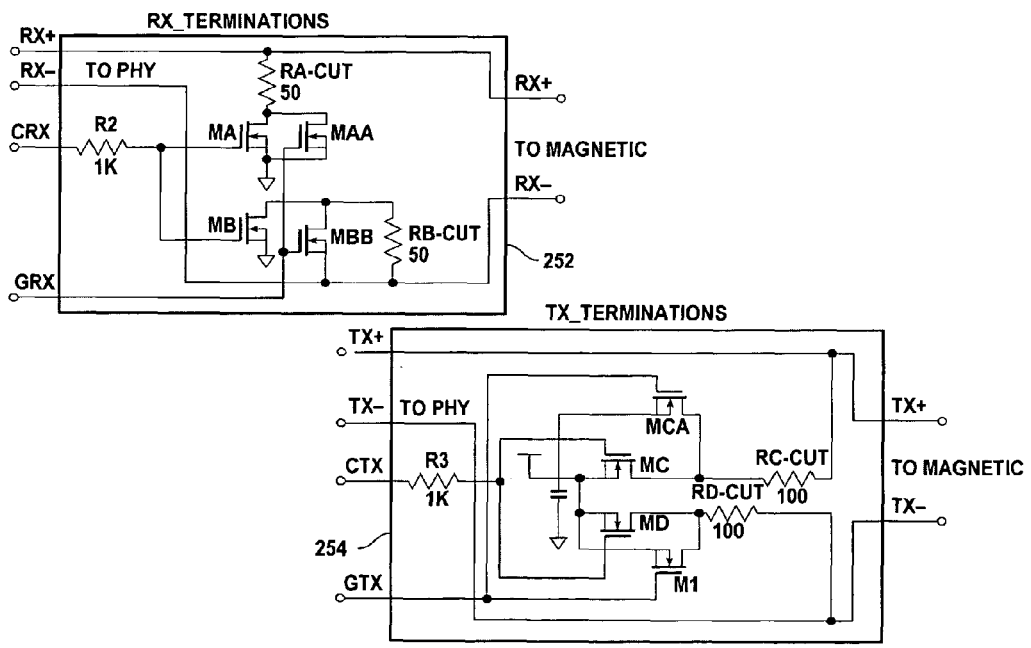

Turning now to FIG. 15, a different version 252 of the RX Termination circuit block 246 and a different version 254 of the TX Termination circuit block 248 of FIG. 14 is presented. In this version additional redundancy is provided where the transistors controlled by the PHY are duplicated to allow the FORCE pin an independent set of transistors to control should MA and MB fail, for example. Thus a single transistor failure will not result in a loss of functionality.

While the above dynamic termination impedance is shown to have two outcomes—100 ohms or high impedance, that is only because the cases addressed needed a 100 ohm or high impedance solution. Those of ordinary sill in the art will now realize that the dynamic termination impedance approach with a higher resolution impedance step adjustment circuit may be coupled to a bit error rate detector or other monitor and that other impedances may be selected to optimize measurable transmission characteristics (such as optimizing the termination impedance to minimize bit error rate, and the like).

Also note that each pair, even in the 10/100 Base T case, must be able to become a transmit and a receive, also all pairs must be able to become data receivers at the same time so that the "slave" may detect problems in the "master" by listening to the cable. Additionally it is desirable to have the ability to make all pairs data receivers at the same time since they will have the role of listening to what the other switch is saying and what the third network device is communicating in real time to detect any problems. This capability requires additional circuitry inside the PHY to recover the signal in real time.

Also note that the PHYs must be able to communicate with one another for the purpose of negotiating the master-slave relationship, communicating status information, communicating detected fault conditions, and arranging for a recovery from a fault condition, among other things. This may be done in a number of ways, but a single pair communication system is attractive because of its ease of implementation using a half-duplex communication protocol between the PHYs. A wireless approach may be used as well.

This approach may be used, for example, in certain scenarios. If the receiver is seeing too many errors on a PHY due to a transient of some kind that broke the receiver on switch 1 or it is fully impaired for some reason, then switch 1 may communicate with the third network device and switch 2 will see valid packets on the wire going from the third network device to switch 1 but cannot on its own tell if switch 1 is seeing errors. Switch 1 may send special packets to the third network device that the third network device will ignore but switch 2 will recognize as flags passing control to switch 2 asking it to become the master (control packets). For the purposes of shutting down the transmitter on switch 1 and negotiating such a control transfer, a single-pair half-duplex communication may take place. Such communications could alternatively take place over wireless means, a dedicated link between the two switches, common mode signaling between the two switches, unused conductor pairs, and the like. Such communications may, if desired, use the IEEE 802.3 Fast Link Pulses technology or any other communications protocol and may be half- or full-duplex for communicating control, status and like information between the two switches.

If switch 1 becomes faulty and other communications means are not available, impedance modulation may be used to transmit a status, initiate a status check, or request a switch to switch conversation, or request a slave to third network device communication. The impedance modulation is implemented with the termination circuits discussed elsewhere herein as they can be used to modulate a termination impedance on the transmission line which modulation can be seen by all connected devices. In one example, this may be implemented in one embodiment of the present invention with a lookup table in each switch that looks for the termination changing from say 100 ohms to high-impedance some predetermined number of times in a row, telling the slave, in effect, to take over. Of course this process would time out after a few seconds if the termination suddenly is disrupted and does not go back to its original state. In another example this may be implemented as follows. After the link is operational the master is terminated with 100 ohms, and the slave is left without a 100 ohm termination. If switch 2 is the slave and decides that it wants to communicate with switch 1, it may take its impedance back to 100 ohms "upsetting" the termination, a back and forth change from high-impedance to 100 ohms in a predetermined manner (e.g., number of times) to signal the start of a half-duplex PHY to PHY communication. The third network device can detect this by listening to its own transmitted signal and it will be designed to back off (i.e., not transmit or expect packets while keeping its link status up) while that communication takes place between the first two devices. The third network device may also be designed to recognize such communications for the purposes of modifying its own behavior. It may back off, stop transmission, transmit and wait for a reply, or manage its own communications keeping its link status signal valid, allowing the switches to negotiate status, control and order any actions that may be needed. It may listen in to get out of such a mode at the end of the switch-to-switch communication, use a time out designed for such a purpose, or get a specific link available from either switch. Also the third network device may change its RX impedance to request a conversation, but in the case of a long cable the "termination" effect may render the detection such a request harder, the third network device may still use a special signal (e.g., special data patterns) to flag the slave that it wants a direct communication with the slave, and for the slave to initiate such a conversation it would change its impedance to flag such a request.

Figure 17:
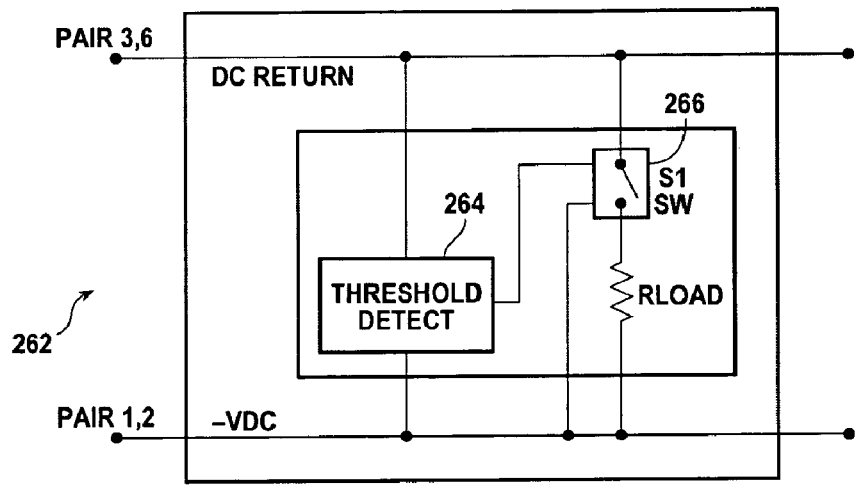
FIG. 17 is an electrical schematic diagram of an identity network in accordance with various embodiments of the present invention.

Turning now to FIG. 17, a configuration of an identity network 262 which may be used with some of the circuits of the present invention is illustrated. Identity network 262 is a special PD that is ON (i.e., it draws a few mA to bias the series diodes (FIG. 13) ON, allowing the data AC (alternating current) signal through) when the PSE power is "OFF". In this case the PSE still supplies low DC current to permit the biasing of the diodes above a few volts (i.e., about 5 VDC or less). This PD is high-impedance allowing the easy discovery of the conventional IEEE 802.3af 25k identity network (25,000 ohm resistor) in the PD or third network device. If the third network device is not a PD then the PSE will supply such small DC current at low voltages to keep the diodes low impedance for data transmission. The threshold detect circuit block 264 senses an applied voltage above about 5 VDC (i.e., above idle) and, in response, opens switch 266 so that the circuit looks like a high impedance when voltages above about 5 VDC (e.g., discovery, classification or regular inline power) are applied. Below that voltage level (i.e., at idle), the switch is closed exposing the load to the small amount of power available. If desired, the threshold detect circuit 264 may close switch 266 again when normal inline power (around 48 VDC) is applied. This can assist in making the identity network discoverable and avoiding conflict during the discovery and classification stages prior to application of regular inline power. The threshold detect circuit may be implemented with resistors and zener diodes and the switch may be implemented with a depletion-type FET with breakdown protection circuitry. Other approaches will now be apparent to those of ordinary skill in the art.

If either PSE on the wire goes high while the other tries to determine the presence of the Y device, it would see a high impedance also (since the PSEs are analog OR-ed). For this purpose the PSE controller must be able to sense the voltage on the wire, i.e., to see if the 48 VDC is present, or if there is a discovery or classification cycle taking place (i.e., a voltage greater than about 5 VDC is present). In that case it knows to back off and try later. Such back off timing may be a value of time that is predetermined or agreed upon among the devices, or the PSE may monitor via its high-impedance sensing the wire voltages and seize the wire for its own search for a PD and the Y device's common mode identity network at the first chance where the cable voltage drops below the right value, of course at that instant, the Y device acting as a PD would draw a pre-determined value of DC current from each switch that they can both measure. This can also be handled by any other available communication system including wireless and common mode.

Another function of this PD is to flag the presence of the Y device to both switches by using its unique identity network, i.e., the current it draws, that would go to zero above a few volts (i.e., above idle).

Figure 18:
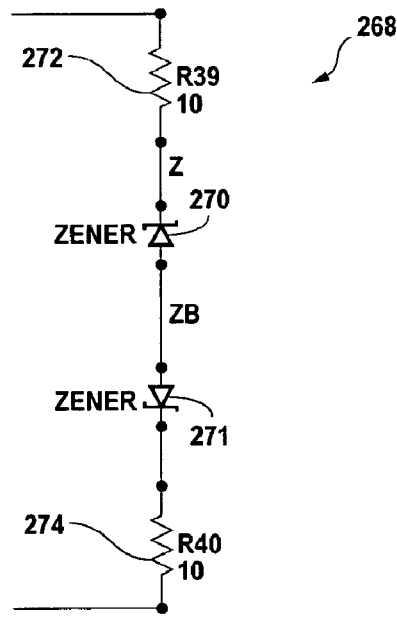
FIG. 18 is an electrical schematic diagram of a single-pair identity network in accordance with various embodiments of the present invention.

In FIG. 18 an example of a single-pair identity network 268 as may be used in some of the preceding circuits is illustrated in more detail. The identity network 268 includes a pair of low-capacitance zener diodes or equivalent circuitry 270 coupled to a pair of conductors through a first resistor 272 and a second resistor 274. Such a network 268 (as well as others) would allow a TDR (time domain reflectometer) or similar technique to detect the presence of something other than a 100 ohm impedance when a special signal is applied, flagging the presence of a special device (i.e., the Y device) on the wire. Note that such an identity network may be unique to each pair. In one case resistors 272 and 274 may be 10 ohm resistors in series with two-zener diodes 270 and 271 and the PHY sends a pulse that is much higher than the zener voltage in addition to a diode drop causing the breakdown and the attenuation to occur across the pair. The PHY in the switch receives its own transmitted signal and it can detect the presence of the Y device by sensing the drop in the amplitude of the voltage applied to discover the Y device. If only a 100 ohm termination was present the signal would be unmodified. Such a check may be performed periodically at lower frequencies when the link is down, or it can be initiated once a 100 ohm termination is detected. Note that under normal power and data operation this network is high-impedance and low capacitance and therefore it does not affect the data. For uniqueness, various different zener diode voltages, combinations of zener voltage equivalent circuitry and diodes may be used as desired.

In operation, the Y device must be discovered by both switch 1 and switch 2. The Y device acts as a fully symmetrical connection—in some embodiments it simply shorts three RJ45 connectors together on a conductor by conductor basis. The Y device may be discovered as follows. When configured properly (all devices are connected), the Y device causes an impedance perturbation at each switch's PHY on both the RX and TX pairs. The TX pairs would detect such perturbations and order the local impedance adjusted on all pairs (i.e., if both switches have a 100 ohm termination, a valid third port with a cable attached can cause the effective impedance to change to 50 ohms and is detected in both switches configured specifically to look for this condition, signaling the presence of a Y device. If only two devices are attached, then a regular point-to-point Ethernet connection is present. If three devices are attached with very long cables, then the Y device approach is not applicable and other schemes may be used to avoid the stub attenuation effect and keep a point to point communication going. If two network devices are connected to the Y device with relatively short cables and there is a relatively long cable not terminated and not coupled to anything, then the signal will be loaded down due to the effective termination presented by the long cable (approaching 100 ohms) and therefore, lowering the speed to 10 Base T and/or using pulses such as, for example, the Ethernet Fast Link Pulses would help in this situation to maintain communication between the two network devices. This would occur if, for example, the two network devices were providing redundant power and data to a VOIP telephone and the VOIP telephone were suddenly disconnected and the two network devices needed to communicate with one another to decide how to respond to the unplug event.

Alternatively, the Y device may be discovered by having each switch perform a common mode discovery process to look for a special signature that resembles that of the identity network of FIG. 17 (low impedance at or below about 5 VDC (i.e., idle) and high-impedance above that level (i.e., above idle)—other voltage inflection points could be selected instead of 5 VDC). Note that if switch 1 and switch 2 are coupled via a straight cable the impedance would look no different than the Y device arrangement unless a single pair identity network (e.g., FIG. 18) is used across one or more pairs in the Y device along with the common mode identity network.

Where two redundancy-supporting switches (switch 1 and switch 2) are attached first to a Y device and the third network device is not at that point in time connected (i.e., the connector is open), since each transmitter on every PHY is capable of receiving packets/pulses (transmitters are joined together by the Y device). Special pulses (such as those used for Autonegotiation, proprietary pulses, and/or a mixture of both) may be exchanged by the switches to let the switches figure out that they are tied together. Also, the switches are free to operate as a data network node at this instant or in the absence of a third network device because, from a data perspective, the switches cannot tell that there is anything special about this link other than they both support redundancy and that they are both certain types of switches and that they can sense the presence of the Y device. So, in the absence of a third network device, the switches are free to exchange data. If a long cable is attached at the third interface of the Y device but is not coupled to a third network device at its far end, then the switch-switch communication may still be possible, but the switches might need to adjust their termination impedances to appropriate values as the long cable may cause an effective termination. The effective cable termination is an indication that a Y device is present. It is up to the PHYs in both switches and the PSEs in both switches to see the third network device as it gets plugged in. Both switches are capable of communicating while ignoring the third network device and at times they may back off and look for a third network device to see if it was recently attached. They may do this by looking for a termination impedance change (as with a TDR) or by looking for communication signals from the third network device.

Where one redundancy supporting switch and a third network device are coupled to the Y device and the other redundancy supporting switch is absent for some reason and the third network device is a PD/DTE type device such as an Internet telephone, the port of the Y device coupled to the first switch and the port of the Y device coupled to the PD/DTE may operate like a normal network link, unless the switch is configured (via software/firmware) to wait for information exchange from the other switch so it will keep the link down or allow it to come up only conditionally for a period of time awaiting the availability of the redundant switch. Such operation can be based on a special PD class of the third network device (discoverable through the discovery and classification process) that tells the attached switch to wait and give it redundancy or nothing, or possibly ignore redundancy (e.g., in case some repair needs to be performed, go ahead and supply the power and data). There is a potential problem if the second network device is unplugged while the third port is powered—it risks a hot connection suddenly at the open port of the Y device. Also the presence of inline power in the absence of the Link integrity routine or the plug-in of the second switch causes the second switch not to discover the common mode signature of the Y device. The use of the single-pair identity network would help solve this problem, along with a PSE designed to back off periodically to check for a hot cable (i.e., the presence of 48 VDC and/or discovery voltages). Diode control as in FIG. 13 would also solve this problem. It is best that no inline power be supplied unless the port on the Y device for the third network device is properly terminated and the switches have negotiated the setup. One way to alleviate this problem is to avoid powering devices unless both switches can execute their Link Integrity routine successfully ahead of powering the link. Another approach would be to remove inline power the instant an impedance disruption or a TDR flag happened.

If a legacy PD that does not require redundancy is attached to a port of the Y device, then a switch attached to any of the other ports on the Y can be configured to operate normally or wait. While one of the ports is not used, the attached switch is free to try and collect information about the attached device, i.e., whether it has a PD, its class, and possibly test the link. Also it may opt to run the link temporarily awaiting the presence of the redundant switch and send out messages to a network control point requesting assistance.

Where two redundant switches are present and a third network device is present and it is a switch/PSE the two redundant switches will see signals coming from the third network device and in response they will negotiate as to who will start a "link integrity routine". First, a TDR in the PHY of each switch can measure the total cable length between the two switches to verify that they are of acceptable (short) length. The exchange between the two switches allows for a specific random or system-based codeword to be generated (it could, for example, be the day's date and the port number/device ID coded in binary, hexadecimal, or the like, sent as pulses, as well as anything else) and shared among devices to be stored in permanent memory as a password to insure that no unauthorized use of the connection is made, since data may be duplicated to both devices and to act as a "soft identity token" allowing a quicker recovery and boot up of the disconnected device as it attempts to come back on line. Then each switch would take control of the link, provide inline power to the third network device if needed, and exchange data with the third network device (the third network device may be requested, for example, to report if it is receiving error free at the speed and duplex chosen, and different data patterns may be sent during this test for testing purposes), while the other switch would be in a "monitor mode" (i.e., it would listen to the conversations from the first network device to the third network device and from the third network device to the first network device in real time). In this mode all pairs on the idle switch may act as receivers in accordance with some embodiments of the present invention, it would also check the amplitude of the inline power voltage and possibly communicate with both the PD or third network device and the PSE using common mode signaling methods.

After some data exchange to check the link from one of the switches (e.g., switch 1) to the third network device, switch 1 sends a special pulse passing control to the second switch (having the role of slave at this time), so as to have the first switch back off into monitor mode and allow the second switch to start its link integrity routine. Once the second switch has completed its link integrity routine, the two switches exchange some pulses to agree which will take on the role of slave and which will take on the role of master. Such agreement may be based on inline power requirements (i.e., one switch may have much more inline power to offer or data traffic requirements), or the agreement may be forced by software/firmware, a setup by a system administrator, or by default. The third network device may request service from either switch 1 or switch 2 automatically or via user-induced selection (i.e., pre-configured software/firmware or a physical or virtual pushbutton). When such a request is made, all devices have to agree and acknowledge before the change takes place. When a problem presents itself, a user option via a software menu or a physical or virtual pushbutton at the third device (e.g., a VOIP Phone), may allow a user to select the alternate source of power and or data. Such a request may be transmitted using any available communications means, such as common mode over the conductors of the wired data telecommunications network, dedicated link, wireless link, impedance modulation, and the like. The communications means used may optionally be based on the type of failure or the reason for the failure.

Once the agreement is reached, one switch would go to monitor mode and thus perform the role of slave and listen to some or all conductor pairs at once and possibly it can have its inline power active (on) to provide simultaneous backup inline power or hot-standby backup inline power. It doesn't matter whether the PD (third network device) draws its current from one switch or both so long as it can never drop power totally if one power supply in a switch faulted. The PD may draw its current over 2-pairs or 4-pairs.

If a fault occurs on the master, the slave would sense it via the monitor mode and it would change its transmit circuit into a transmitter again and send a special sequence of pulses to the transmitter of the master instructing it to back off. If the master cannot receive such a message because it has a broken transmitter (or simply does not respond) a termination impedance signal may be sent (as described in detail above) for the purpose of getting this message to the master. The message could additionally or alternatively be sent by a dedicated data link or a common mode signaling technique. If necessary the slave could shut off the power to part or all of the master switch to get it to stop transmitting.

Another purpose for running a dedicated connection between the two redundant switches (in the case of 10/100 Base T such a connection can be over the same cable using the otherwise unused Pair 4-5 and Pair 7-8 pairs and in the case of 1000 Base T or higher a dedicated connection allows us to actively and continuously test the whole setup. In such an arrangement, the slave could send some special packets (test packets) to the master, which, in turn, would pass them on to the third network device, which in turn would pass them on to the master switch while the slave is in monitor mode so it can see its own request go across the pairs thus testing the whole setup including the third network device. The slave may opt to do this at periodic intervals or when it senses no data transfer on the wires. Again, if the link between the two switches fails to force the master to back off (e.g., the switch's software no longer is up), the inline power communication or other communications means could be used to force the master to shut the PHY down but to keep the dynamic termination impedance circuitry operating so that it presents the proper value. In another embodiment both the master and the slave on their own would send occasional special packets (status packets) dispersed among normal data packets reassuring the slave that they are both up. This may be detected using either the detection of the missing 'well and alive' status packets that help the slave act like a watchdog, or using the approach where the slave instructs the master to talk to the third network device while the third network device sends information back to the master. In a similar manner using common mode communications, each PSE and a PD may be doing periodic or request-based voltage and or current modulation to deliver status, management and or control messages via power connections about the inline power state on the wire. For example PSE 1 may send a signal to the PD to send back the value of the current consumed by the PD at one instant. Such a check may be used to calculate the dissipated power in the cable and or to see if the PD is using any current from PSE 2 since PSE 1 knows how the current being drawn out of its power supply it can calculate the difference. Alternatively, a communication may be used to relay messages to PSE 2 about the status of PSE 1 and vice versa.

Another feature to help troubleshoot and/or isolate problems should they occur would be to allow packet loopback in each device at the PHY level. This would be started either upon software/firmware command, or by the PHY's detection of a special test packet, data pattern, or signal. This would help insure that the physical layer is in proper shape when the slave can test the physical layer alone and can determine if the problem is in the software of either the master or the third network device. Such a loopback can take place periodically when data is not present or upon command.

Figure 19:
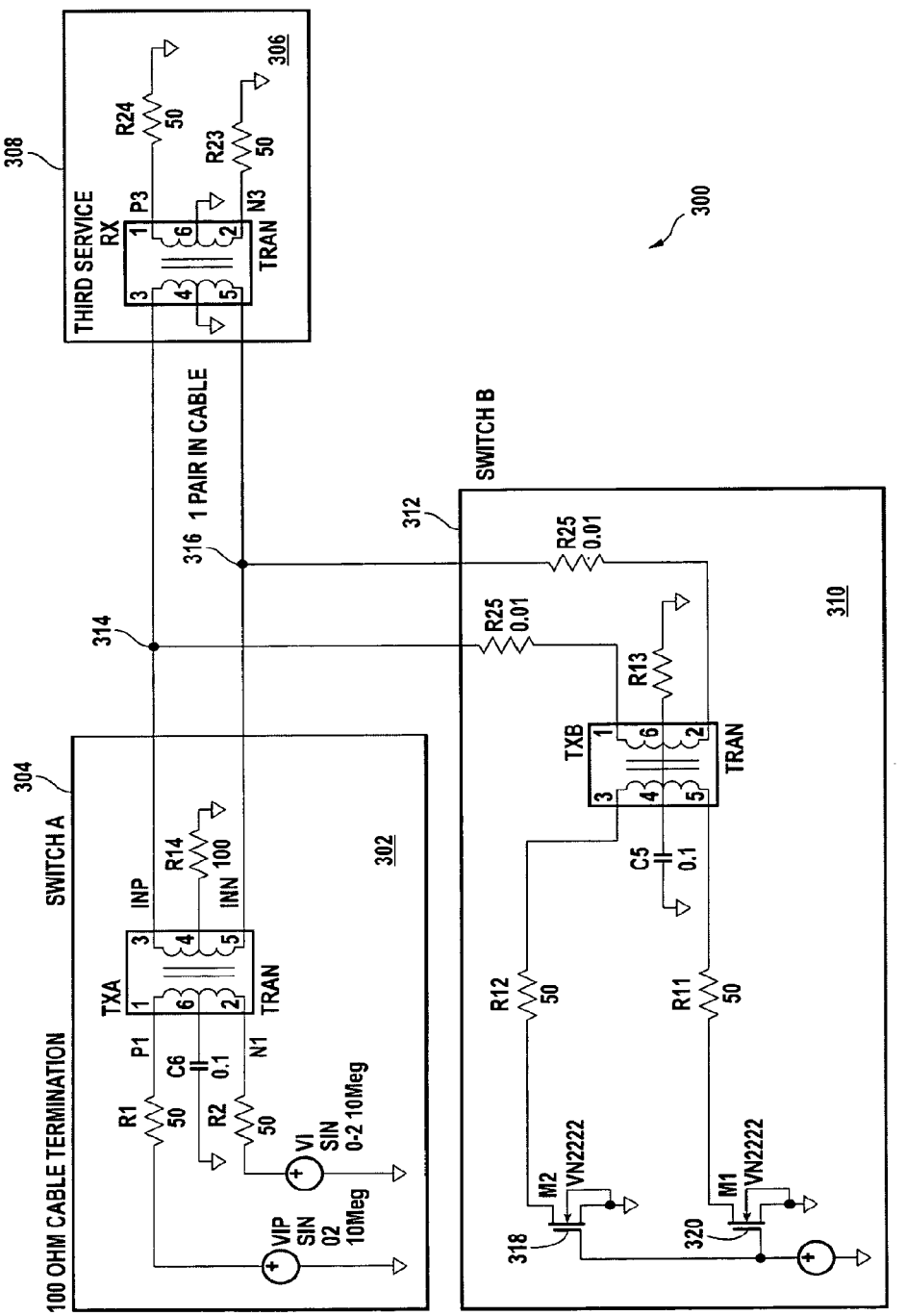
FIG. 19 is an electrical schematic diagram of a network segment implementing an impedance communication scheme in accordance with an embodiment of the present invention.

In one embodiment of the present invention, the Ethernet (or other wired data communication network) termination impedance may be used for communicating status, reporting a problem, initiating a request such as a request for a speed change or data source change, or inline power related, such as turn inline power on or off, and the like. This approach may be used, for example, in a situation such as that depicted in FIG. 19. In the network segment 300 depicted in FIG. 19, a first port 302 of a first switch network device such as a data communications switch 304 is coupled to a corresponding port 306 of a third device 308. Note that one pair of wires is illustrated in FIG. 19 for simplicity but multiple pairs may be present. A first port 310 of a second network device such as a data communications switch 312 is coupled to the wires connecting the first switch with the third device via a direct connection as shown at nodes 314, 316.

This approach is not standard but will work, as pointed out above, if the wire lengths from the nodes 314, 316 to the second switch are kept relatively short. Ethernet is a point-to-point communications connection between and among two devices over one cable so the data is active on one pair of wires between only two devices at one time. With three devices connected as shown in FIG. 19 the logical connection can only really exist between one pair of them at any moment and thus a mechanism for requesting a device to "back off" for a time is required to enable the formation of a connection between the other pair of devices. For example, in this case, the desire would be to have the connection between the first switch and the third device suspend while the second switch (which was monitoring communications between the first switch and the third device) attempts to establish communications with either the third device or the first switch.

We'll call the second switch 312 the non-active switch and the first switch 304 the active switch. In order for the non-active switch 312 to take control of the link, it would need to sense a condition (such as a fault) that would justify taking control. Such faults might include data faults, inline power faults, and the like. In order for it to actively listen to the link, its termination circuitry is not grounded, i.e., it is in a high-impedance state with FET transistors 318, 320 set to OFF and its PHY transmitter circuitry is set to act as a receiver only to watch the packets on the line. If it senses a "fault", then it needs to ask the active switch 304 to back off (since in this scenario there is no desire to establish a connection between the two switches). This may be accomplished by forcing the termination circuitry on the first port 310 of the second (non-active) switch 312 from a high-impedance state to a 50-ohm impedance state by setting transistors 318, 320 to ON (e.g., by asserting the signal VTERM). Since Ethernet switches normally monitor their own signals with a built-in transmit-side receiver in the PHY, the active switch 304 will detect this impedance change and, with appropriate programming, will know to back off and allow the non-actve switch 312 to establish a connection with third device 308. Modulation of this impedance state (e.g., chains of impedance pulses of varying durations) can be used to send more complex messages between the two switches so that, for example, the second switch can detect a problem, and take over, or request that the communications between the first switch and the third device proceed at a different communications speed, or the like.

Figure 20:
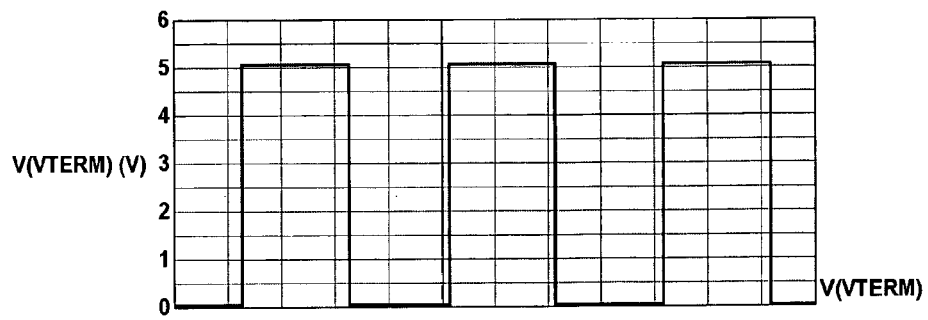
FIG. 20 is a graph showing the voltage of the VTERM signal (corresponding to an impedance modulation signal) plotted against time.
Figure 21:
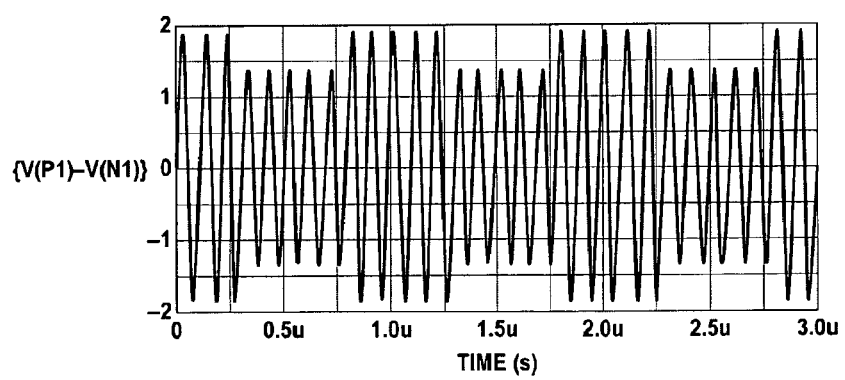
FIG. 21 is a graph of the difference of the voltages received at the first switch plotted against time for periods when VTERM is asserted and not asserted.

Turning now to FIGS. 20 and 21, FIG. 20 is a graph showing the voltage of the VTERM signal (corresponding to the impedance modulation signal) plotted against time and FIG. 21 is a graph of the difference of the voltages received at the first switch plotted against time. As can easily be seen, when VTERM is asserted, the standard Ethernet voltage pulses have less measured amplitude than when VTERM is not asserted. Accordingly, this signaling technique may be used to send a flag for a request for a direct conversation among both switches to negotiate link status, master-slave relationship, or anything else using packets, FLP (Ethernet Fast Link Pulses), lower frequency pulses, proprietary symbols, and the like.

Figure 22:
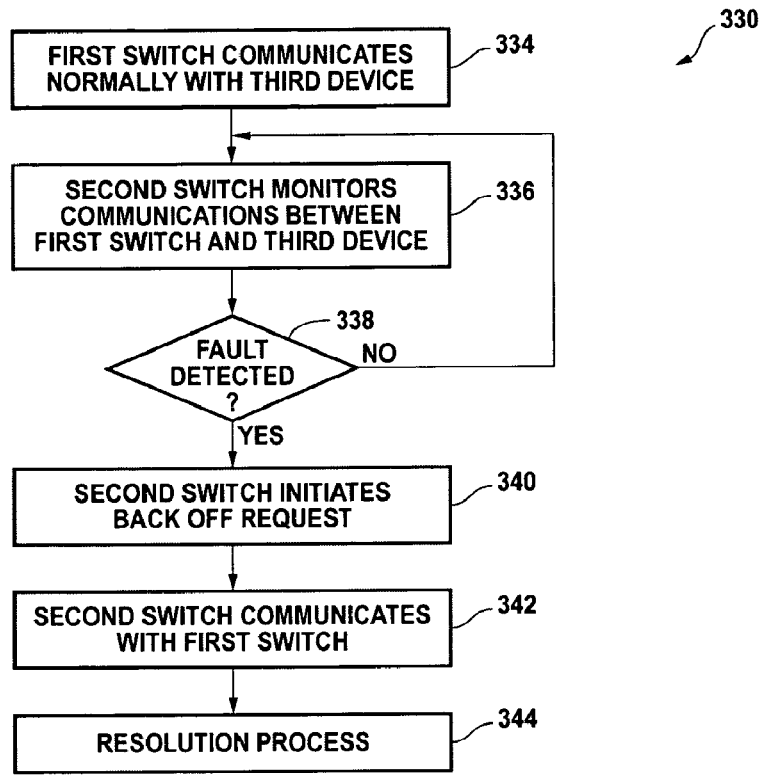
FIG. 22 is a process flow diagram illustrating a first portion of a process for resolving communication faults in accordance with an embodiment of the present invention.
Figure 23:
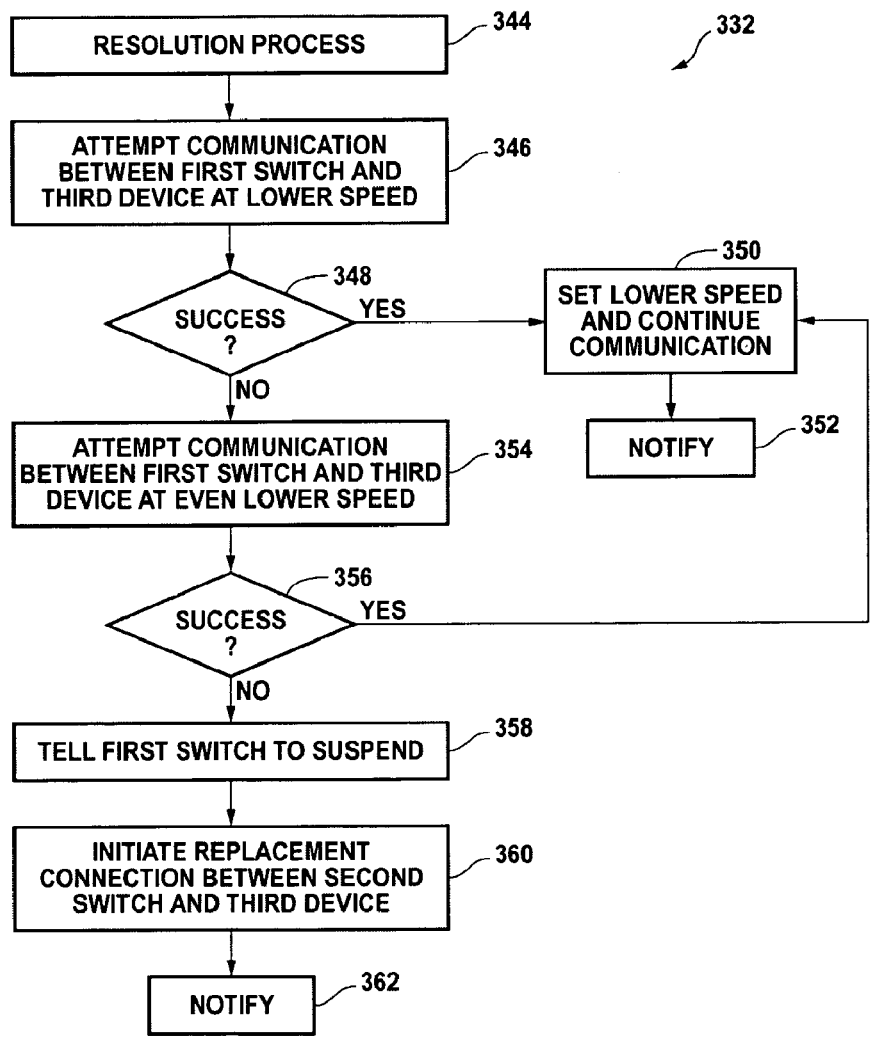
FIG. 23 is a process flow diagram illustrating a second portion of a process for resolving communication faults in accordance with an embodiment of the present invention.

FIG. 22 is a process flow diagram illustrating a first portion 330 of a process for resolving communication faults in accordance with an embodiment of the present invention. FIG. 23 is a process flow diagram illustrating a second portion 332 of a process for resolving communication faults in accordance with an embodiment of the present invention. At 334 the first switch is communicating normally with the third device, such as an Internet telephone, or the like. Such communications generally include the periodic transmission of various types of well-known packets and/or pulses. The absence of such packets and/or pulses can indicate trouble such as a locked-up component, failed component, or the like.

At 336 the second switch monitors communications between the first switch and the third device as described above.

At 338 if a fault is detected, control passes to 340 and if not, control passes back to 336. A fault detection may be due to the lack of data packet traffic, fast link pulses, other link pulses, link beat signals, discovery protocol packets, lack of inline power, or any other condition of interest on the wire.

At 340 the second switch initiates a back off request. It does this by loading the line by setting its impedance termination to a lower impedance than its normal high-impedance state. A switch aware of this capability for impedance communication that is still alive (as opposed to failed and unable to respond) may respond by backing off and going into FLP mode to carry out an auto negotiation process among the three devices to establish status, control, master-slave relationship, and the like. In many situations, this step will clear the fault and communications may proceed. If not, control passes to 342.

At 342 the second switch and the first switch communicate to attempt to resolve the fault. The resolution process for fault resolution is denoted 344 and is described in more detail in FIG. 23.

Figure 24:
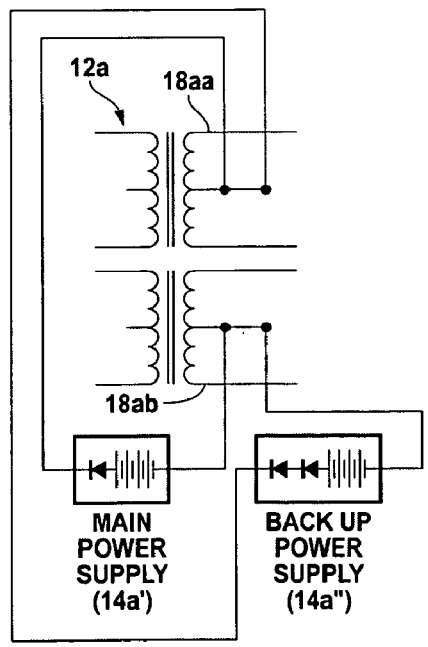
FIG. 24 is an electrical schematic diagram of a circuit segment providing backup inline power to a network segment.

At 346, one approach to fault resolution is to try lower speeds. In most cases, while higher speeds are desirable, lower speeds are preferable to a complete link failure and many activities can be carried out successfully at lower speeds. So, assuming that the link was initially set at a speed of 1000 MB/sec (1000 Base T) it may be re-tried at 100 Base T (348, 350) and 10 Base T (354, 356) before deciding to try to let the second switch take over the link (358, 360). In each case, some kind of notification should be sent to a network control point to assist in ultimate resolution of the detected problem (352, 362). When the second switch takes over the link to establish a replacement connection, the replacement connection may be at a speed which is the same or different from the original link speed between the first switch and the third device. In most situations, the replacement connection will be at a lower speed than the original connection speed, typically because the second switch to third device connection will only be able to support a lower speed communication rate, such as 10 Base T as opposed to a 100 Base T or 1000 Base T communication rate existing between the first switch and the third device.

Where the detected problem is a loss of inline power, several options are available. First, as illustrated in FIG. 24, one option is to provide inline power over both the first switch and the second switch. If power management is of no concern, both can be active at all times. Normally, however, power management is of concern, thus the first switch (main power supply) can be set to provide inline power at one voltage level and the second switch (backup power supply) can be set to provide inline power at a slightly different voltage level (e.g., by dropping the voltage through one or more diodes) so that current flows from the first switch while it is operating, and when it stops supplying inline power because its voltage has dropped significantly (or to zero) then the other switch will automatically and relatively instantly supply inline power. In the FIG. 24 embodiment, one diode is provided at the Main Power Supply (PSE 14a') to avoid power flowing into it and two diodes are provided at the Backup Power Supply (PSE 14a") to set it at a lower voltage. Those of ordinary skill in the art will now recognize that many other voltage setting mechanisms such as voltage regulators, different numbers of diodes or transistors, and the like, may be used to accomplish the same or an equivalent effect.

Alternatively, when providing backup inline power, it may be desirable to use impedance communications to ask the first switch to formally shut down its inline power circuitry so that it does not come back up while the backup inline power is active. This would be desirable, perhaps, where one does not want to make too much current available.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A method for providing network communications between a first and a second network device associated with a first node of a network and a third network device associated with a second node of the network, in a wired data telecommunications network, the method comprising:
   directing simultaneously, from the first network device, network communications to the third network device and to the second network device at a first speed through a Y-device;
   directing simultaneously, from the third network device, network communications to the first network device and to the second network device at the first speed through the Y-device;
   monitoring network communications between the first network device and the third network device with the second network device; and
   detecting at the second network device a condition in the network communications between the first network device and the third network device.

2. The method of claim 1, further comprising:
   initiating, responsive to said detecting, an impedance modulated signal from the second network device onto the wired data telecommunications network;
   receiving at the first network device, the impedance modulated signal; and backing off communications between the first network device and the third network device in response to said receiving.

3. The method of claim 2, further comprising:
attempting to establish communications between the first network device and the third network device at a second speed different from said first speed.

4. The method of claim 3, wherein: said second speed is lower than said first speed.

5. The method of claim 3, further comprising:
failing to establish communications between the first network device and the third network device at the second speed different from said first speed;
establishing a replacement communications connection between the second network device and the third network device in response to said failing.

6. The method of claim 5, wherein:
said establishing establishes the connection at the second speed different from said first speed.

7. The method of claim 6, wherein:
said second speed is lower than said first speed.

8. The method of claim 7, further comprising:
sending a message to a network control point in response to said detecting.

9. The method of claim 8, wherein said sending is performed using the wired data telecommunications network to send a message from the second network device.

10. The method of claim 8, wherein said sending is performed using a wireless telecommunications link to send a message from the second network device to a wireless node coupled to the wired data telecommunications network, and from the wireless node to the network control point.

11. The method of claim 1:
wherein the Y-device includes a first identity network configured to receive inline power from the first device and a second identity network configured to receive inline power from the second device; and
wherein the third device is configured as a powered device (PD).

12. An apparatus for providing network communications between a first and a second network device associated with a first node of a network and a third network device associated with a second node of the network, in a wired data telecommunications network, the apparatus comprising:
means for directing simultaneously, from the first network device, network communications to the third network device and to the second network device at a first speed through a Y-device;
means for directing simultaneously, from the third network device, network communications to the first network device and to the second network device at the first speed through the Y-device;
means for monitoring network communications between the first network device and the third network device with the second network device; and
means for detecting at the second network device a condition in the network communications between the first network device and the third network device.

13. The apparatus of claim 12:
wherein the Y-device includes a first identity network configured to receive inline power from the first device and a second identity network configured to receive inline power from the second device; and
wherein the third device is configured as a powered device (PD).

14. A system for providing network communications between a first and a second network device associated with a first node of a network and a third network device associated with a second node of the network, in a wired data telecommunications network, the system comprising:
circuitry for directing simultaneously, from the first network device, network communications to the third network device and to the second network device at a first speed through a Y-device;
circuitry for directing simultaneously, from the third network device, network communications to the first network device and to the second network device at the first speed through the Y-device;
circuitry for monitoring network communications between the first network device and the third network device, said circuitry for monitoring associated with the second network device; and
circuitry for detecting at the second network device a condition in the network communications between the first network device and the third network device.

15. The system of claim 14, further comprising:
circuitry for transmitting, responsive to said circuitry for detecting, an impedance modulated signal from the second network device onto the wired data telecommunications network;
circuitry for receiving at the first network device, the impedance modulated signal; and
circuitry responsive to said circuitry for receiving for backing off communications between the first network device and the third network device.

16. The system of claim 14:
wherein the Y-device includes a first identity network configured to receive inline power from the first device and a second identity network configured to receive inline power from the second device; and
wherein the third device is configured as a powered device (PD).

* * * * *